(12) United States Patent
O'Neill

(10) Patent No.: US 8,102,792 B2
(45) Date of Patent: *Jan. 24, 2012

(54) ENABLING FOREIGN NETWORK MULTICASTING FOR A ROAMING MOBILE NODE, IN A FOREIGN NETWORK, USING A PERSISTENT ADDRESS

(75) Inventor: Alan O'Neill, Henley Beach (AU)

(73) Assignee: QUALCOMM Incorporated, San Diego, CA (US)

( * ) Notice: Subject to any disclaimer, the term of this patent is extended or adjusted under 35 U.S.C. 154(b) by 702 days.

This patent is subject to a terminal disclaimer.

(21) Appl. No.: 12/041,613

(22) Filed: Mar. 3, 2008

(65) Prior Publication Data

US 2008/0151808 A1    Jun. 26, 2008

Related U.S. Application Data

(63) Continuation of application No. 10/172,357, filed on Jun. 14, 2002, now Pat. No. 7,339,903.

(60) Provisional application No. 60/298,282, filed on Jun. 14, 2001, provisional application No. 60/301,069, filed on Jun. 26, 2001, provisional application No. 60/301,122, filed on Jun. 27, 2001.

(51) Int. Cl.
*H04L 12/66* (2006.01)
*H04W 4/00* (2009.01)

(52) U.S. Cl. .......... 370/313; 370/352; 370/401

(58) Field of Classification Search .......... None
See application file for complete search history.

(56) References Cited

U.S. PATENT DOCUMENTS

| | | | |
|---|---|---|---|
| 4,679,244 | A | 7/1987 | Kawasaki et al. |
| 4,833,701 | A | 5/1989 | Comroe et al. |
| 4,901,307 | A | 2/1990 | Gilhousen et al. |
| 5,056,109 | A | 10/1991 | Gilhousen et al. |
| 5,095,529 | A | 3/1992 | Comroe et al. |
| 5,128,938 | A | 7/1992 | Borras |
| 5,200,952 | A | 4/1993 | Bernstein et al. |
| 5,210,787 | A | 5/1993 | Hayes et al. |
| 5,229,992 | A | 7/1993 | Jurkevich et al. |

(Continued)

FOREIGN PATENT DOCUMENTS

EP    1244261    1/2000

(Continued)

OTHER PUBLICATIONS

C. Perkins, Editor "IP Mobility Support", Network Working Group, pp. 1-79 (Oct. 1996).

(Continued)

*Primary Examiner* — Chi Pham
*Assistant Examiner* — Soon-Dong Hyun
(74) *Attorney, Agent, or Firm* — Raphael Freiwirth

(57) ABSTRACT

Permitting a mobile host to roam in a foreign network, with multiple access node handoffs, while permitting foreign network multicasting by (i) having the mobile node (MN) use a persistent address, for purposes of multicasting, and (ii) relaxing or modifying reverse path forwarding checks, and (iii) modifying the forwarding of multicast packets sent from a non-local source address. The persistent address, used in mobile networks as the source address in the IGMP Membership reports and the multicast packets, may be the permanent and hence stable host home address (HoA). This enables the HoA to be supported as a source address by foreign agents (FAs) and multicast routing protocols in foreign networks.

26 Claims, 15 Drawing Sheets

U.S. PATENT DOCUMENTS

| | | |
|---|---|---|
| 5,247,516 A | 9/1993 | Bernstein et al. |
| 5,251,209 A | 10/1993 | Jurkevich et al. |
| 5,267,261 A | 11/1993 | Blakeney, II et al. |
| 5,325,332 A | 6/1994 | Tagaya |
| 5,325,362 A | 6/1994 | Aziz |
| 5,325,432 A | 6/1994 | Gardeck et al. |
| 5,369,781 A | 11/1994 | Comroe et al. |
| 5,387,905 A | 2/1995 | Grube et al. |
| 5,420,909 A | 5/1995 | Ng et al. |
| 5,450,405 A | 9/1995 | Maher et al. |
| 5,461,645 A | 10/1995 | Ishii |
| 5,463,617 A | 10/1995 | Grube et al. |
| 5,465,391 A | 11/1995 | Toyryla |
| 5,473,605 A | 12/1995 | Grube et al. |
| 5,491,835 A | 2/1996 | Sasuta et al. |
| 5,511,232 A | 4/1996 | O'Dea et al. |
| 5,513,381 A | 4/1996 | Sasuta |
| 5,542,108 A | 7/1996 | Sasuta |
| 5,566,366 A | 10/1996 | Russo et al. |
| 5,572,528 A | 11/1996 | Shuen |
| 5,590,396 A | 12/1996 | Henry |
| 5,594,948 A | 1/1997 | Talarmo et al. |
| 5,625,882 A | 4/1997 | Vook et al. |
| 5,627,882 A | 5/1997 | Chien et al. |
| 5,634,197 A | 5/1997 | Paavonen |
| 5,806,007 A | 9/1998 | Raith et al. |
| 5,884,196 A | 3/1999 | Lekven et al. |
| 5,898,922 A | 4/1999 | Reininghaus |
| 5,901,362 A | 5/1999 | Cheung et al. |
| 5,903,559 A | 5/1999 | Acharya et al. |
| 5,987,323 A | 11/1999 | Huotari |
| 6,011,969 A | 1/2000 | Vargas et al. |
| 6,021,123 A | 2/2000 | Mimura |
| 6,021,326 A | 2/2000 | Nguyen |
| 6,055,236 A | 4/2000 | Nessett et al. |
| 6,078,575 A | 6/2000 | Dommety et al. |
| 6,092,111 A | 7/2000 | Scivier et al. |
| 6,134,226 A | 10/2000 | Reed et al. |
| 6,144,671 A | 11/2000 | Perinpanathan et al. |
| 6,160,798 A | 12/2000 | Reed et al. |
| 6,161,008 A | 12/2000 | Lee et al. |
| 6,195,705 B1 | 2/2001 | Leung |
| 6,225,888 B1 | 5/2001 | Juopperi |
| 6,240,089 B1 | 5/2001 | Okanoue et al. |
| 6,256,300 B1 | 7/2001 | Ahmed et al. |
| 6,275,712 B1 | 8/2001 | Gray et al. |
| 6,286,052 B1 | 9/2001 | McCloghrie et al. |
| 6,298,058 B1 | 10/2001 | Maher et al. |
| 6,308,080 B1 | 10/2001 | Burt et al. |
| 6,308,267 B1 | 10/2001 | Gremmelmaier |
| 6,353,616 B1 | 3/2002 | Elwalid et al. |
| 6,366,561 B1 | 4/2002 | Bender |
| 6,366,577 B1 | 4/2002 | Donovan |
| 6,385,174 B1 | 5/2002 | Li |
| 6,400,703 B1 | 6/2002 | Park et al. |
| 6,400,722 B1 | 6/2002 | Chuah et al. |
| 6,407,988 B1 | 6/2002 | Agraharam et al. |
| 6,425,352 B2 | 7/2002 | Perrone |
| 6,434,134 B1 | 8/2002 | La Porta et al. |
| 6,445,922 B1 | 9/2002 | Hiller et al. |
| 6,446,127 B1 | 9/2002 | Schuster et al. |
| 6,452,915 B1 | 9/2002 | Jorgensen |
| 6,466,964 B1 | 10/2002 | Leung et al. |
| 6,477,150 B1 | 11/2002 | Maggenti et al. |
| 6,487,170 B1 | 11/2002 | Chen et al. |
| 6,487,407 B2 | 11/2002 | Goldberg et al. |
| 6,487,605 B1 | 11/2002 | Leung |
| 6,496,505 B2 | 12/2002 | La Porta et al. |
| 6,498,934 B1 | 12/2002 | Muller |
| 6,505,047 B1 | 1/2003 | Palkisto |
| 6,510,144 B1 | 1/2003 | Dommety et al. |
| 6,515,966 B1 | 2/2003 | Bardalai et al. |
| 6,519,254 B1 | 2/2003 | Chuah et al. |
| 6,538,989 B1 | 3/2003 | Carter et al. |
| 6,539,225 B1 | 3/2003 | Lee |
| 6,546,252 B1 | 4/2003 | Jetzek et al. |
| 6,563,919 B1 | 5/2003 | Aravamudhan et al. |
| 6,567,416 B1 | 5/2003 | Chuah |
| 6,567,664 B1 | 5/2003 | Bergenwall et al. |
| 6,571,095 B1 | 5/2003 | Koodli |
| 6,571,289 B1 | 5/2003 | Montenegro |
| 6,578,085 B1 | 6/2003 | Khalil et al. |
| 6,584,093 B1 | 6/2003 | Salama et al. |
| 6,611,506 B1 | 8/2003 | Huang et al. |
| 6,611,547 B1 | 8/2003 | Rauhala |
| 6,615,236 B2 | 9/2003 | Donovan et al. |
| 6,631,122 B1 | 10/2003 | Arunachalam et al. |
| 6,636,498 B1 | 10/2003 | Leung et al. |
| 6,650,901 B1 | 11/2003 | Schuster et al. |
| 6,654,363 B1 | 11/2003 | Li et al. |
| 6,678,735 B1 | 1/2004 | Orton et al. |
| 6,680,943 B1 | 1/2004 | Gibson et al. |
| 6,687,655 B2 | 2/2004 | Oosthoek et al. |
| 6,690,936 B1 | 2/2004 | Lundh |
| 6,711,147 B1 | 3/2004 | Barnes et al. |
| 6,711,172 B1 | 3/2004 | Li |
| 6,738,362 B1 | 5/2004 | Xu et al. |
| 6,742,036 B1 | 5/2004 | Das et al. |
| 6,747,961 B1 | 6/2004 | Ahmed et al. |
| 6,763,007 B1 | 7/2004 | La Porta et al. |
| 6,765,892 B1 | 7/2004 | Leung et al. |
| 6,842,462 B1 | 1/2005 | Ramjee et al. |
| 6,853,639 B1 | 2/2005 | Watanuki et al. |
| 6,862,622 B2 | 3/2005 | Jorgensen |
| 6,876,668 B1 | 4/2005 | Chawla et al. |
| 6,904,110 B2 | 6/2005 | Trans et al. |
| 6,910,068 B2 | 6/2005 | Zintel et al. |
| 6,915,325 B1 | 7/2005 | Lee et al. |
| 6,937,590 B2 | 8/2005 | Lee |
| 6,937,950 B2 | 8/2005 | Cragun et al. |
| 6,963,918 B1 | 11/2005 | Leung |
| 6,970,443 B2 | 11/2005 | Dynarski et al. |
| 6,973,057 B1 | 12/2005 | Forslow |
| 6,999,435 B2 | 2/2006 | Perras |
| 7,000,026 B2 | 2/2006 | Beshai et al. |
| 7,002,937 B1 | 2/2006 | Dispensa et al. |
| 7,006,472 B1 | 2/2006 | Immonen et al. |
| 7,020,082 B2 * | 3/2006 | Bhagavath et al. ............ 370/230 |
| 7,027,400 B2 | 4/2006 | O'neill |
| 7,080,127 B1 * | 7/2006 | Hickman et al. .............. 709/208 |
| 7,099,687 B1 * | 8/2006 | Makela et al. .............. 455/552.1 |
| 7,136,388 B2 | 11/2006 | Friedrichs et al. |
| 7,161,929 B1 | 1/2007 | O'neill et al. |
| 7,281,043 B1 | 10/2007 | Davie |
| 7,295,608 B2 | 11/2007 | Reynolds et al. |
| 7,339,903 B2 | 3/2008 | O'neill |
| 7,369,522 B1 * | 5/2008 | Soininen et al. .............. 370/328 |
| 7,546,376 B2 | 6/2009 | Widegren et al. |
| 2001/0027490 A1 | 10/2001 | Fodor et al. |
| 2001/0036164 A1 | 11/2001 | Kakemizu et al. |
| 2001/0041571 A1 | 11/2001 | Yuan et al. |
| 2001/0046223 A1 | 11/2001 | Malki et al. |
| 2002/0015396 A1 | 2/2002 | Jung |
| 2002/0018456 A1 | 2/2002 | Kakemizu et al. |
| 2002/0026527 A1 | 2/2002 | Das et al. |
| 2002/0068565 A1 | 6/2002 | Purnadi et al. |
| 2002/0071417 A1 | 6/2002 | Nakatsugawa et al. |
| 2002/0089958 A1 | 7/2002 | Feder et al. |
| 2002/0114469 A1 | 8/2002 | Faccin et al. |
| 2002/0136226 A1 | 9/2002 | Christoffel et al. |
| 2002/0147820 A1 | 10/2002 | Yokote |
| 2002/0161927 A1 | 10/2002 | Inoue et al. |
| 2002/0186679 A1 | 12/2002 | Nakatsugawa et al. |
| 2002/0191593 A1 | 12/2002 | O'Neill et al. |
| 2003/0012179 A1 | 1/2003 | Yano et al. |
| 2003/0016655 A1 | 1/2003 | Gwon |
| 2003/0051140 A1 | 3/2003 | Buddhikot et al. |
| 2003/0060199 A1 | 3/2003 | Khalil et al. |
| 2003/0117969 A1 | 6/2003 | Koo et al. |
| 2003/0137961 A1 | 7/2003 | Tsirtsis et al. |
| 2003/0137991 A1 | 7/2003 | Doshi et al. |
| 2003/0176188 A1 | 9/2003 | O'Neill |
| 2003/0228868 A1 | 12/2003 | Turanyi et al. |
| 2004/0185777 A1 | 9/2004 | Bryson |
| 2005/0129019 A1 | 6/2005 | Cheriton |

FOREIGN PATENT DOCUMENTS

| | | |
|---|---|---|
| WO | WO 95/12297 | 5/1995 |
| WO | WO 96/27993 | 9/1996 |
| WO | WO 97/12475 | 4/1997 |
| WO | PCT/US98/47302 | 10/1998 |

OTHER PUBLICATIONS

Li, Yalun "Protocol Architecture for Universal Personal Computing" IEEE Journal on Selected Areas in Communications 15(8): 1467-1476 (1997).

IETF, Network Working Group, Request for Comments: 2205, Resource Reservation Protocol (RSVP)—Version 1 Functional Specification, pp. 1-105 (Sep. 1997).

IETF, Network Working Group, Request for Comments: 2206, RSVP Management Informatin Base Using SMIv2, pp. 1-60 (Sep. 1997).

IETF, Network Working Group, Request for Comments: 2207, RSVP Extension for IPSEC Data Flows, pp. 1-14 (Sep. 1997).

IETF, Network Working Group, Request for Comments: 2210, The Use of RSVP with IETF Integrated Services, pp. 1-31 (Sep. 1997).

IETF, Network Working Group, Request for Comments: 2208, Resource Reservation Protocol (RSVP) Version 1 Applicability Statement Some Guidelines on Deployment, pp. 1-6 (Sep. 1997).

IETF, Network Working Group, Request for Comments: 2209, Resource Reservation Protocol (RSVP)—Version 1 Message Processing Rules, pp. 1-24 (Sep. 1997).

J. Moy, Editor, "OSPF Version 2", Network Working Group, pp. 1-244 (Apr. 1998).

Valko, Andras "Cellular IP: A New Approach to Internet Host Mobility" Computer Communications Review 29(1): 50-65 (1999).

TIA/EIA/IS-707A.8 "Data Service Options for Spread Spectrum Systems: Radio Link Protocol Type 2" pp. 1-1:4:12 (Mar. 1999).

Karagiannis, Mobile IP, State of the Art Report, pp. 1-63, Jul. 1999.

Elin Wedlund et al., "Mobility Support Using SIP", Proc. of ACM/IEEE International Conference on Wireless and Mobile Multimedia (WoWMoM '99), Seattle, Washington, Aug. 1999.

Henning Schulzrinne et al., "Application-Layer Mobility Using SIP", 0-7803-7133 IEEE, pp. 29-36, Jan. 2000.

"Source Specific Multicast (SSM) Explicit Multicast (Xcast)" pp. 1-27 (Copyright 2001 by ETRI).

IETF Network Working Group, Request for Comments: 2961, RSVP Refresh Overhead Reduction Extensions, pp. 1-32 (Apr. 2001).

Marshall, W., et al., Integration of Resource Management and SIP, IETF Internet Draft, draft-ietf-sip-manyfolks-resource-02.txt, Aug. 2001, pp. 1-28.

Andrew T. Campbell et al., "IP Micro-Mobility Protocols", ACM SIGMOBILE Mobile Computer and Communication Review (MC2R), vol. 14, No. 4, pp. 34-54, Oct. 2001.

S. Zhou et al., "A Location Management Scheme for Support Mobility In Wireless IP Networks Using Session Initiation Protocol (SIP)", 1531-2216/01 IEEE, Oct. 2001, pp. 486-491.

Bos, L., et al., A Framework for End-to-End Perceived Quality of Service Negotiation, IETF Internet Draft, draft-bos-mmusic-sdpqos-framework-00.txt, Nov. 2001, pp. 1-22.

Papalilo, D., et al., Extending SIP for QoS Support www.coritel.it/publications/IP_download/papalilo-salsano-veltri.pdf, Dec. 8, 2001, pp. 1-6.

Camarillo, P., et al., Integration of Resource Management and SIP, IETF Internet Draft, draft-ietf-sip-manyfolks-resource-04.ps, Feb. 25, 2002 pp. 1-18.

Ho, Integration AAA with Mobile IPv4, Internet Draft, pp. 1-59, Apr. 2002.

"SIP: Session Initiation Protocol", IEFT Network Wording Group, Request for Comments: 3261, (Jun. 2002), pp. 1-29.

IETF, Network Working Group, Request for Comments: 3261 "SIP: Session Initiation Protocol", pp. 1-269 (printed as pp. 1-252) (Jun. 2002).

NetworkWorking Group, IPv6 Prefix Delegation Using ICMPv6, pp. 1-33, Apr. 2004.

IETF Mobile IP Working Group, "Mobility Support in IPv6", D. Johnson, Rice University, C. Perkins, Nokia Research Center, J. Arkko, Ericsson; Feb. 26, 2003, downloaded from http://www.join.uni-muenster.de on Dec. 29, 2004, pp. 1-158.

Network Working Group, "IP Mobility Support for IPv4", C. Perkins, Ed., Nokia Research Center, Jan. 2002, downloaded from http://www.ietf.org on Dec. 29, 2004, pp. 1-92.

International Search Report—PCT/US02/018795, International Search Authority—United States Patent Office—Sep. 12, 2002.

\* cited by examiner

ENABLING FOREIGN NETWORK MULTICASTING FOR A ROAMING MOBILE NODE, IN A FOREIGN NETWORK, USING A PERSISTENT ADDRESS

§0. RELATED APPLICATIONS

The present application is a continuation of U.S. patent application Ser. No. 10/172,357, filed on Jun. 14, 2002 U.S. Pat. No. 7,339,903 which claims benefit to the filing date of: (i) provisional patent application Ser. No. 60/298,282, entitled "ENABLING THE MOBILE IP MULTICAST SOURCE ADDRESS TO BE THE HOME ADDRESS THROUGH CONFIGURATION AND/OR MODIFICATION TO PIM SPARSE-MODE MULTICAST ROUTING PROTOCOL", filed on Jun. 14, 2001 and listing Alan O'Neill as the inventor; (ii) provisional patent application Ser. No. 60/301,069, entitled "METHODS AND APPARATUS FOR PERFORMING RSVP AGGREGATION", filed on Jun. 26, 2001, and listing Alan O'Neill as the inventor; and (iii) provisional patent application Ser. No. 60/301,122, entitled "METHODS AND APPARATUS FOR SELECTIVE ROUTING AND FORWARDING SUPPORT FOR MOBILE HOSTS", filed on Jun. 27, 2001 and listing Scott Corson, Alan O'Neill, Matthew Impet, Vincent Park and George Tsirtsis as the inventors, for any inventions disclosed in the manner provided by 35 U.S.C. §112, ¶1. Each of the above listed provisional and utility applications is expressly incorporated herein by reference. However, the invention is not intended to be limited by any statements in the provisional application(s). Rather, the provisional application(s) should be considered to describe exemplary embodiments of the invention.

§1. BACKGROUND OF THE INVENTION

§1.1 Field of the Invention

The present invention concerns multicasting data. More specifically, the present invention concerns enabling a mobile node to move between foreign access nodes (e.g., routers) while maintaining the ability to source and receive multicast data.

§1.2 Background of the Invention

§1.2.1 Introduction to Communications Networks, Such as Those Supporting the Internet Protocol Many communications networks are made up of interconnected nodes (referred to as "routers" in the specification below without loss of generality) for forwarding addressed data (referred to as "packets" in the specification below without loss of generality). The routers may be geographically distributed throughout a region and connected by links (e.g., optical fiber, copper cable, wireless transmission channels, etc.). In such a network, each router typically interfaces with (e.g., terminates) multiple input links and multiple output links. Packets traverse the network by being forwarded from router to router until they reach their destinations (as typically specified in so-called layer-3 addresses in the packet headers). Unlike switches, which establish a connection for the duration of a "call" or "session" to send data received on a given input port out on a given output port, routers determine the destination addresses of received (ingress) packets and, based on these destination addresses, determine, in each case, the appropriate output link on which to send them. The address of the next node (layer 2 address) is often referred to as a "next hop" address. The interface terminating the particular output link may be referred to as a "next hop" interface. Since, unlike switches, routers are not connection-based—packets having the same destination address may actually traverse different paths through the network.

§1.2.2 Introduction to Multicasting and IP Multicasting Protocols

Multicasting allows instances (or copies) of data from a single source to be provided to multiple destinations. Such data may be provided as datagrams, and such datagrams may be sent over a network supporting the Internet protocol ("IP"). For example, IP multicast enables a packet addressed to a multicast group destination address to be replicated and delivered within an internet routed infrastructure, to multiple receiving hosts. The multicast enables routers to compare the received multicast packets to a multicast forwarding table and send a copy of the received packet out to all the interfaces named in that multicast forwarding table down which there are presently multicast receivers. Typically, multicast routing protocols build a "dynamic delivery tree" to connect sender(s) to the receivers.

Multicast routers typically employ "reverse path forwarding" ("RPF") checks to arriving multicast packets. Using the RPF check, a router compares the interface on which a multicast packet arrives to an outgoing interface that would be used, in accordance with unicast routing, were the router to forward data to the multicast sender (as identified by the source address field of the multicast packet). If these interfaces are not the same, then the multicast packet should be dropped (since it presumably arrived on an incorrect interface). This RPF check is used to prevent routing loops.

An example of a multicast routing protocol is described in the document D. Estrin et al., "Protocol Independent Multicast-Sparse Mode (PIM-SM): Protocol Specification," *Request for Comments:* 2362, (The Internet Society. June 1998) (hereafter referred to as "RFC 2362", "PIM", or "PIM-SM", and incorporated herein by reference). RFC 2362 uses signaling defined in the document W. Fenner, "Internet Group Management Protocol, Version 2", *Request for Comments:* 2236, (The Internet Society. November 1997) (hereafter referred to as "RFC 2236" or "IGMP" or "IGMPv2" and incorporated herein by reference). Note that IGMP v2 is being superceded IGMPv3 and other similar multicast membership protocols exist. Basically, under RFC 2362, hosts join and leave multicast groups by first sending IGMP "Group Membership Reports" ("GMRs") to the access router which is acting as the IGMP Querier which is known in PIM as the "Designated Router". The access router converts the IGMP messages into "PIM JOIN" messages (or equivalent messages for other multicast protocols). A host that is a member of a multicast group may both send and receive multicast on that group. A non-group member host (that has not sent an IGMP report) may also send to a multicast group, but non-member hosts will not receive multicast packets from other senders to that group.

In PIM, the reception of new IGMP Reception reports for new groups, causes the Designated Router ("DR") to join towards the new multicast group by joining either to the multicast group via a "shared multicast tree", or to the sender via a "sender-specific tree". In a shared multicast tree, the originator first sends the multicast packets to the root of the tree (referred to as the Rendezvous Point ("RP") in PIM). The root (e.g., RP) then forwards the packets down the tree to the group receivers. In PIM, the receivers join (the multicast group) towards the IP address of the rendezvous point and intermediate routers aggregate the joins up the tree towards the root such that only one join per group per link is generated. On the other hand, in a source specific tree, the receivers simply join (the multicast group) towards the source or originator of the multicast stream (which is identified by the source address of the multicast packets in the stream).

The reverse path forwarding (RPF) check on the PIM source-specific tree is towards the unicast address in the source address of the multicast packet. The RPF check in PIM and other shared trees, between the receiver and the root of the tree, is done towards the address of the root of the shared tree (i.e., the Rendezvous Point) rather than to the source address of the multicast packet. This is because the multicast packets should only be received via the rendezvous point (RP)—not directly from the sender. The RPF check between the sender and the RP is still on the sender address because this part of the tree is sender specific.

Multicast receivers in PIM receive packets down a unidirectional tree from either the rendezvous point (RP) or the sender. In contrast, multicast packets sent to a designated router (DR) are first sent to the top of the unicast receivers tree, this tree being either (a) the DR for a sender tree, requiring no additional action, or (b) the RP which does require additional action. Initially, in case of the packets being sent to the RP, the DR uses a PIM Register message to encapsulate the multicast data, and then sends the Register message to the RP. The RP then de-encapsulates the multicast data and forwards it down the shared tree to the receivers. The RP can then send a source specific PIM JOIN back towards the originator(s) DR, that sent the Register message, based on the contents of the Register message and configuration in the RP, this typically being designed to trigger a PIM JOIN back towards high data rate sources. The PIM JOIN arrives at the DR which causes data packets to be sent both natively and via Register messages to the RP. Consequently, while messages are received natively at the RP, the RP sends Register Stop messages periodically back to the DR to suppress Register messages. Register messages restart if Register Stops are no longer received at the DR for a certain period of time.

§1.2.3 Mobile Nodes and IP Mobility

Although most of the hosts that use the Internet, or some other IP network, access the network at consistent access points during a session, mobile nodes, such as cellular telephones, wireless computing devices and personal assistants for example, may also want to access an IP network while it moves from different access points of the IP network. The document, C. Perkins, "IP Mobility Support for IPv4", *Request for Comments:* 3220, (The Internet Society, January 2002) (hereafter referred to as "RFC 3220" or "MIP", and incorporated herein by reference) describes a protocol for enabling a moving Internet host to connect to an access router in a foreign network, containing a Foreign Agent ("FA"), yet still be contactable on its persistent Host Home Address (HoA) that it uses on its home network and is likely contained in the DNS system. This is possible because the FA gives the host a temporary local address that is either (a) unique to the host—dubbed a "Co-located Care of Address" (CCoA), or (b) unique to the FA and shared by multiple hosts at that FA—dubbed a "Care of Address" (CoA). The CCoA or CoA is registered back on the home network into a Home Agent ("HA") and the HA tunnels (encapsulation) arriving packets destined for the HoA towards the mobile Host address (CCOA) or the FA address (CoA) which respectively detunnel the packet and deliver the packet to the HoA of the mobile Host. In the case of CcoA, the host itself detunnels the packet. In the case of the FA CoA, the FA detunnels the packet.

MIP mentions two methods for a mobile node ("MN") to obtain multicast service. The first mobile multicast method uses the multicast routing capabilities of the home agent (HA) and home network multicast system. Thus, this first mobile multicast method is referred to as "home network multicast".

The second mobile multicast method uses the multicast routing capabilities of the foreign agent (FA) and the foreign network multicast system. Thus, this second mobile multicast method is referred to as "foreign network multicast". These mobile multicast methods are described in more detail below.

§1.2.3.1 MIP Home Network Multicast

MIP home network multicast signaling is reviewed in §1.2.3.1.1. Then, MIP home network multicast data transport is reviewed in §1.2.3.1.2.

§1.2.3.1.1 MIP Home Network Multicast—Signaling

With MIP's home network multicast, a multicast router on the home subnet acts as the IGMP Querier and the same or another multicast router acts as the Designated Router (DR). With regard to multicast signaling, the IGMP Querier issues IGMP General and Group Specific Queries onto the subnet using the all-systems multicast group (224.0.0.1). Since the Home Agent (HA) is a member of the all-systems group on the home subnet, it receives the IGMP messages from the IGMP Querier. If a mobile node (MN) has an active registration with the home agent (HA) and that registration has the 'B' bit set (meaning forward broadcast traffic), then the HA can forward the IGMP Query to the MN via the registered CoA. If the MN is using a CCoA, then the HA encapsulates the IGMP message from the HA address to the CCoA. This packet is sent directly to the MN which de-encapsulates it to reveal the IGMP message. If the MN is using a foreign agent (FA) CoA, then the HA first encapsulates a packet from the HA address to the HoA of the MN, and then additionally encapsulates from the HA address to the FA CoA. When this double encapsulated packet is received and the outer encapsulation is de-encapsulated by the FA, the inner encapsulation enables the FA to correctly identify the target MN from the HoA and to unicast the encapsulated broadcast packet to the MN over the access subnet.

The mobile node (MN) also originates IGMP Membership Reports and sends these back to the home subnet via the home agent (HA) to be received by both the IGMP Querier, and other members of the all-systems multicast group on the home subnet. More specifically, the IGMP messages are sent from the MN host home address (HoA) to the all-systems or all-multicast routers multicast addresses. They are then encapsulated, by the MN, with the HoA source address and the HA destination address. If the MN has selected "reverse tunneling", then the MN can alternatively use the Encapsulating Delivery Style (EDS) and instead tunnel to the foreign agent (FA) first, which can then tunnel the packet to the HA identified in the visitor list for the source HoA.

Note that when the mobile node (MN) is either sending or receiving home network IGMP messages, whether tunneled directly or via the foreign agent (FA), the FA does not manage IGMP state for the mobile node (MN). Instead, such IGMP state is fully managed by the home agent (HA) and MN. (There is an opportunity for the FA to track group memberships however by snooping the tunneled IGMP messages.)

Once a MN is undertaking IGMP message exchanges, it can then receive and source multicast traffic. This is described in §1.2.3.1.2 below.

§1.2.3.12 MIP Home Network Multicast—Data Transport

To receive multicast traffic, the mobile node (MN) sends an IGMP Membership report towards the home agent (HA) which forwards it, after de-encapsulation, to the Home subnet and the IGMP Querier on that subnet. This causes multicast traffic for that group to be forwarded onto the subnet (if not already present) and the HA to encapsulate the multicast traffic to all MNs with membership of that group, and specifically to the MN that sent the IGMP Membership Report. When the MN is using a FA CoA, multicast forwarding is achieved by the HA encapsulating the multicast packets, from its HA address to the host home address (HoA) of the MN, and then further encapsulating the result from the HA address to the foreign agent (FA) CoA. The FA then removes the outer encapsulation before forwarding the result to the MN. The MN then removes the inner HoA encapsulation to reveal the multicast datagram. If, on the other hand, the MN is using a CCoA then the HA simply needs to encapsulate the multicast packet from the HA address to the CCoA which avoids the need for the double encapsulation.

To send multicast traffic, the mobile node (MN) can be either a member or a non-member of the destination group. In either case, the MN will send the multicast packet from its host home address (HoA) to the group address and then additionally encapsulate the packet from the HoA to the home agent (HA) address (with EDS or without reverse tunneling), or from the HoA to the foreign agent (FA) CoA (with EDS reverse tunneling). In the latter case, the FA then adds the encapsulation from the FA address to the HA address as is normal with reverse tunneling.

§1.2.3.2 MIP Foreign Network Multicast

MIP foreign network multicast signaling is reviewed in §1.2.3.2.1. Then, MIP foreign network multicast data transport is reviewed in §1.2.3.2.2.

§1.2.3.2.1 MIP Foreign Network Multicast—Signaling

To use foreign network multicast, the mobile node (MN) must be able to receive IGMP Queries sent by the IGMP Querier on the foreign subnet of the MN. In general, there will be more than one access router on the subnet, one of which contains the foreign agent (FA) for this MN. The FA, or another router, acts as a multicast router, and either can act as the IGMP Querier. Typically, the FA, the IGMP Querier and Designated Router will be in the same access router that the MN uses for foreign access services. The IGMP Queries are then sent from the FA address to the all-systems multicast group. The MN responds to Queries by replying from either its CCoA (if it has one) or its host home address (HoA), to the appropriate multicast group.

§1.2.3.2.2 MIP Foreign Network Multicast—Data Transport

To receive multicast traffic, the mobile node (MN) will have sent an IGMP membership report for the required group to the all-systems multicast group. This membership report is received by the IGMP Querier which injects the required group into the multicast routing protocol. Arriving multicast packets for that group are sent onto the foreign subnet and are received by member MNs, including the MN that sent the Membership report.

To send multicast traffic, either as a member or non-member sender, the mobile node (MN) issues multicast packets from its CCoA. If an MN does not have a CCoA, the present MIP foreign network multicast protocols do not allow the MN to originate multicast traffic. More specifically, RFC3220 states that mobile hosts that wish to be multicast senders should use its (CCoA), but may use its host home address (HoA) as the source address in IGMP messages, but must only use a CCoA to originate multicast packets into the foreign multicast routing. RFC 3220 only permits an MN to use CCoA when originating multicast packets for foreign network multicast because the source address of the multicast packet must be topologically correct (i.e., not an address from another part of the Internet) to enable the multicast packet to pass reverse path forwarding (RPF) checks. Since the CCoA is a topologically correct address at the FA, a multicast packet with a CCoA source would pass RPF checks in the foreign multicast routing. If the MN were to use its HoA as a multicast source address in the foreign network, such multicast packets would clearly not pass the RPF check because the multicast routing protocol would expect the multicast packets to arrive on interfaces pointing towards the home agent (HA) and not the MN access links on the foreign agent (FA). Consequently, MIP limits foreign network multicast to only those circumstances where the MN has a CCoA.

§1.2.4 Unmet Needs

Typically, when MIP is used in wireless systems, the mobile node (MN) employs a foreign agent (FA) CoA. Unfortunately, this prevents the MN from generally being a multicast sender on the foreign network. This is disadvantageous because multicast via the foreign network avoids the tunnels to and from the home agent (HA) which occur when home network multicasting is used. Note that the tunnel from the sender to the HA is less important because in typical multicast protocols the sender is on a sender specific tree to the root of the tree and on any specific HA there are typically only a small number of senders and all traffic from the senders is unique. However, the tunnels from multiple HAs to the FA for the same multicast group are of concern because each tunnel will contain copies of the same sequence of packets. The aim of multicast is to ensure only one copy of each packet traverses any link in the internet which can clearly not be achieved when MIP tunnels are involved. The size of the problem, compared to the case of the tunnel to the HA, is also magnified due to the fact that typical multicast groups will have significantly more receivers than senders (much like broadcast TV where one content producer (sender) feeds content to large numbers of TV sets (receivers)). Therefore, the more popular a particular piece of content on a multicast group becomes, the more likely that multiple MN receivers will be on the same FA. Consequently, the possibility of duplication of packets, and the scale of wasted bandwidth resources, will increase. Moreover, and perhaps more problematic, this limitation of MIP also denies the operator of the foreign network the ability to offer multicast services to roaming MNs (which would be particularly useful for operator specific content and for commodity (low value) Internet multicast content).

Even if the mobile node (MN) has a CCoA, using this as the source address for multicast packets from a moving (or roaming) MN is problematic since the CCoA may continuously change as the MN moves from one access node (and FA) to another. As a practical matter, the CCoA can only be used if the MN will be using that address for the entirety of the multicast session. Consequently, if the MN and the foreign multicast routing system aren't certain, in advance, that the MN will not need to change its CCoA during a desired multicast session, the home multicast system must be used.

These problematic limitations of MIP are believed to be due to a lack of foresight when MIP was being designed. More specifically, MIP was originally designed assuming that a mobile host would temporarily move to a foreign network for a period of time, and then return home, as would be the case with a traveling salesman moving between customer premises, or a teleworker moving between the home network and the corporate network. Rapid movement of a mobile host between foreign access routers was not really envisaged. In this 'limited roaming' usage assumption, the use of the CCoA is fine because the CCoA, which is allocated and owned by the foreign agent (FA) subnet, is stable for the period of that the mobile host visits the foreign subnet. The source specific multicast routing state in multicast routing protocols is therefore stable—the routing state is always using the same source address for source specific forwarding and the RPF check.

However, apart from its original "limited roaming" usage assumptions, MIP is now being applied to wireless, and specifically cellular, systems. Under such usage scenarios, the CCoA changes at every hand-off (of the mobile host) between foreign agent (FA) access routers. This is because the CCoA must be a topologically correct address at each FA. Each hand-off causes the multicast source address to change, which will confuse the applications at the multicast receivers because the sender address is used during demultiplexing and presentation. Each hand-off will also force the receiving hosts, IGMP and multicast routing to regenerate sender specific multicast join messages for the new source address, and update the associated source specific routing state in the network elements. Finally, receiving applications that are only "listening" to specific senders on a multicast group need to discover sender address change and reconfigure so that they continue to receive only the required packets and do not loose any packets during the address changes. The faster the hand-off, the worse is the confusion, message processing overhead, messaging bandwidth and the overall quality of the multicast packet delivery system. It is believed that the foreign multicast system would effectively be rendered inoperable by these effects. This would effectively force multicast to always be delivered, more expensively, via the home agent (HA) (by using the stable HoA as a source address and tunneling the packets back to the HA where the RPF checks can succeed, and on into the Internet multicast routing system). This tunneling approach could potentially cause multicast intended for local recipients in the foreign domain to have to traverse to the HA at a Home Network on a different continent. Having to send packets via the HA would then also force the MN to also have to receive multicast via the home network and the HA, leading to the significant bandwidth inefficiencies that this entails.

Mobile IP version 6 is a development of Mobile IP for IP version 6 networks and shares many of the design features of MIPv4 and the subsequent multicast problems. In MIPv6, there are no foreign agents (FAs) or FA CoAs, but the access router can contain a mobility attendant. The mobile node (MN) has a CCoA and again this CCoA changes on each hand-off automatically. Therefore, since the CCoA is used as a multicast source address, the problems for the multicast router and sender/receiver applications described above persist. Like MIPv4 which uses the FA to undertake these tasks, MIPv6 uses the mobility attendant to undertake these tasks. Where the MIPv4 solution relies on the state of specific MIP Registration signaling bits so equivalent bits are required and interpreted in MIPv6.

Therefore, there is a need to permit a mobile host to roam in a foreign network, with multiple access node handoffs, while permitting foreign network multicasting.

§2. SUMMARY OF THE INVENTION

The present invention permits a mobile host to roam in a foreign network, with multiple access node handoffs, while permitting foreign network multicasting. The present invention may do so by (i) having the mobile node (MN) use a persistent address, for purposes of multicasting, (ii) relaxing or modifying reverse path forwarding checks, and (iii) modifying multicast forwarding rules.

In one embodiment, the persistent address, used in mobile networks as the source address in the IGMP Membership reports and the multicast packets, is the permanent and hence stable host home address (HoA). In such an embodiment, the present invention enables the HoA to be supported as a source address by foreign agents (FAs) and multicast routing protocols in foreign networks.

If the HoA is to be used as a source address for MIP local multicast at the foreign agent (FA) the present invention may change MIP and multicast forwarding in the host and the access router/designated router/foreign agent as follows. With regard to multicast signaling:

(1) IGMP messages from a mobile node (MN) use the home host address (HoA) as the source address, and the state of the 'B' bit (broadcast) is used by the MN, by default, to determine whether the message is routed to the home agent (HA) or into the local multicast routing protocol. Setting the 'B' bit indicates that IGMP messages will likely be forwarded by the HA to the MN. If the 'B' bit is set then the MN IGMP messages should be sent back to the HA; otherwise, the messages will be sent to the FA. (If the MN has additional information that indicates that the HA will not be broadcasting IGMP messages when the 'B' bit is set, or if the MN is able to receive IGMP in parallel from both HA and FA, then the MN can use other multicast policy state information to decide whether to use foreign or home multicast service.) The MN forwards the IGMP message towards the home or foreign multicast routing by the appropriate use of MIP tunneling as described above. When intended for the foreign multicast system, the IGMP messages are specifically sent unencapsulated by the MN from the HoA as a source address.

(2) The access router detects the presence of the host home address (HoA) source address and uses this to route the IGMP membership report to the foreign agent (FA). The FA verifies that the message came from the mobile node (MN) that owns the HoA and that the HoA has been registered into the FA using MIP signaling. The FA then has mobility state that tells it how to react to the IGMP message.

(3) If the multicast protocol in the designated router (DR) does not itself support the forwarding of multicast packets with non-local (e.g., HoA) source addresses, then the IGMP message is passed to the multicast process with an instruction to the multicast process to build a tunnel interface from any valid HoA source address towards the associated home agent (HA) for group G. (See FIG. 14.) Further, a multicast JOIN for group G is sent into the multicast routing system and the incoming interface of the IGMP message is added as a member of group G. This enables the mobile node (MN) to send via the HA and the home multicast system where the multicast source address (HoA) is topologically correct, but yet still receive efficiently via the foreign multicast system in a hybrid configuration.

(4) If the multicast protocol in the designated router (DR) supports the forwarding of multicast packets with non-local (e.g., HoA) source addresses, then the IGMP message is passed to the multicast process with an instruction to the multicast process to build a normal outgoing interface by sending a multicast JOIN for group G into the multicast routing system and adding the incoming interface of the IGMP message as a member of group G. Sent packets will then typically go out the same interface from which incoming data packets from the core will be received. Note that to support such forwarding, the multicast protocol distributes the access router address into the multicast routing system to be used as the source specific route path forwarding (RPF) check address rather than the HoA source address, and all routers undertake the source specific RPF check to this access router address instead of the address in the multicast data packets.

(5) If the multicast protocol is not able to distribute the access router address and modify the RPF check, but has another way that the multicast protocol can support non-local multicast source addresses, then the IGMP message is sent to the multicast module indicating that such a method should be invoked for this group. For example, the PIM sparse mode protocol can be modified to enable multicast packets with non-local source addresses to be encapsulated in the existing Register message and sent to the Rendezvous Point (RP) from where the packet will pass the RPF check towards the RP, between the RP and all receivers, hence successfully delivering the multicast packets. In doing so, the access router multicast router process ignores any PIM JOINs and Register Stops sent from the RP to the designated router (DR), and continues to forward using Register messages. The Register message could also be extended to inform the RP that this is multicast data from a non-local source address and to therefore not send a source specific JOIN or Register Stops messages to the DR. The foreign agent (FA) to home agent (HA) tunneling in hybrid mode (See FIG. 14.) can therefore be avoided (See FIG. 15.) because the sending tunnel is now to the RP instead of the HA. This is specifically useful when the RP and HA are in different parts of the internet because any traffic tunneled to the HA in hybrid mode still must be sent to the RP before being forwarded to the receivers. It is also exceptionally useful if the RP for a sender specific (i.e., single sender) group is also the sender's DR such that the encapsulation is not required. The RP then has the same address as the DR. Therefore, the RPF check to the DR is simply the RPF check to RP. As the MN hands-off between FAs then either the unicast routing system must move the unicast address of the RP in the topology (host routing) such that the RPF check is unchanged, or each new RP(DR) address is distributed to the multicast routers on the receiver tree to update the RPF check.

With regard to multicast data forwarding:
(1) Multicast content from the mobile node (MN) is sent using the host home address (HoA) as the source address. The state of the 'B' bit (broadcast), or the previous routing of the IGMP messages, is used to determine whether the content is routed to the home agent (HA) or into the local (foreign) multicast system. The MN routes the multicast data towards the home or foreign multicast routing by the appropriate use of MIP tunneling as described above. The foreign routing can use either encapsulation to the HA, or to the rendezvous point (RP), or can use extended multicast forwarding for non-local addresses as described above.
(2) The foreign agent (FA) and multicast processes in the access router keep state as to which of the three options are available so that locally originated multicast packets can be appropriately forwarded. This state can be configured in the FA/DR. A preferred one of these options for a specific mobile node (MN) (or host home address (HoA)) can be provided via authentication, accounting and authorization (AAA), or other protocols from the home operator to the FA and can specifically be used to inform the FA that the HA supports hybrid mode. Alternatively, hybrid mode support can be signaled to the FA in the MIP Registration Reply message using either flag bits or extensions. Essentially the FA otherwise doesn't know if the HA will receive and forward non-member sender multicast traffic when the 'B' bit and 'R' bit are not both set. Only when they are both set does the MN know what to expect from the HA.
(3) The home host address (HoA) source address in the multicast data packet is detected and used by the foreign agent (FA) (e.g., within the access router) to access the (e.g., MIP) visitor list. This allows the mobile node (MN) originated data to undergo a validity check on the non-local multicast source address (HoA is not a local address on the foreign network) against the visitor list state to confirm that the HoA is valid, is assigned to the MN sending the multicast data and is registered at the current FA. The FA then passes the multicast packet to the multicast forwarding process for passing to the required outgoing interfaces, plus the other local receivers.
(4) Note that in FIG. 14, the packets are forwarded to the home agent (HA) by the foreign agent (FA) even though the "B" bit is not set. (This forwarding is also independent of the 'R' bit.) Such forwarding to the HA is performed if the multicast routing and forwarding process in the access router does not itself directly support HoA-based foreign multicast. In addition, the multicast process also sends a copy of the multicast packet to all other local receivers on that access router that are members of that multicast group. This is achieved by the FA inserting a special outgoing interface into the multicast forwarding table when the FA receives an IGMP membership report for group G. This special outgoing interface may be a tunnel interface to a HA that owns the HoA that is included in a multicast data packet sent unencapsulated to the access router from an MN that owns that HoA. This special interface is group and source specific in that it is intended solely for the HoA/HA pair, with one such entry created for all MNs on the access router for all groups.
(5) The foreign agent (FA) checks its visitor list to see if the sender's address in incoming multicast packets from the core network is a host home address (HoA) in its visitors list. If this is the case, then the FA drops the multicast packet because local receivers will already have been served by these packets before they were tunneled to the home agent (HA) and is the equivalent to the processing when packets are sent to and received from an RP or with any unidirectional multicast tree delivery system.

§3. BRIEF DESCRIPTION OF THE DRAWINGS

§4. DETAILED DESCRIPTION

Figure 1:
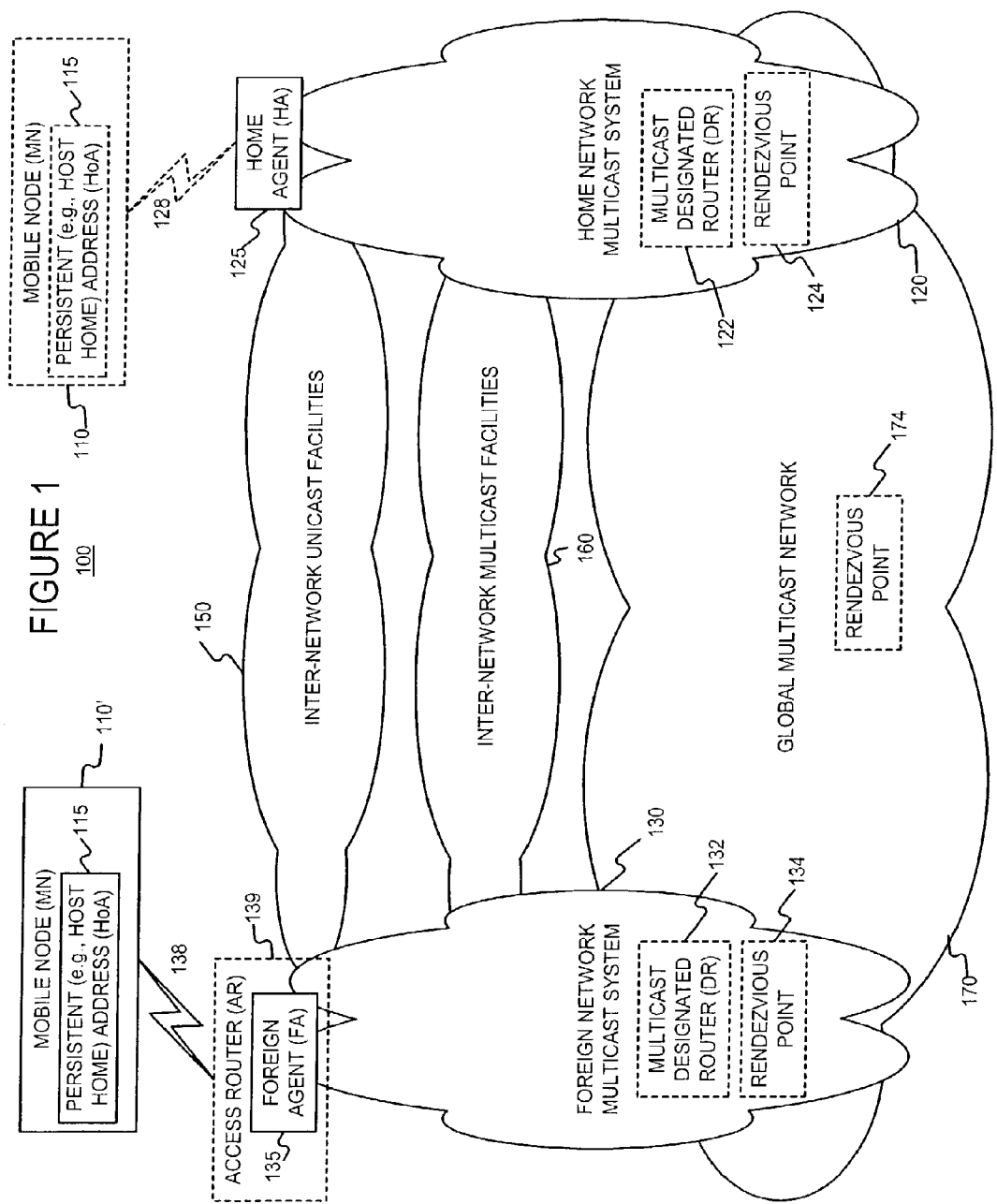
FIG. 1 illustrates an environment in which the present invention may be used.

The present invention involves novel methods, apparatus and data structures for enabling a mobile host to roam in a foreign network, with multiple access node handoffs, while permitting foreign network multicasting. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown and the inventor regards his invention as the following disclosed methods, apparatus and data structures and any other patentable subject matter.

In the following, an exemplary environment in which the invention may operate is described in §4.1. Then, operations that may be performed by various devices in accordance the present invention are introduced in §4.2. Then, exemplary methods and data structures that may be effected by such devices, as well as examples illustrating how such methods operate, are described in §4.3. Finally, some conclusions regarding various aspects of the present invention are provided in §4.4. First, however, some terms are introduced.

Mobile Node: A host or router that changes its point of attachment from one network or sub-network to another. A mobile node may change its location without changing its IP address; it may continue to communicate with other Internet nodes at any location using its (constant or persistent) IP address, assuming link-layer connectivity to a point of attachment is available. A mobile node is given a long-term (or persistent) (e.g., IP) address on a home network. This home address may be administered in the same way as a "permanent" IP address is provided to a stationary host. When away from its home network, a "care-of address" is associated with the mobile node and reflects the mobile node's current point of attachment. The mobile node normally uses its home address as the source address of all IP datagrams that it sends.

Home Agent: A node (such as a router, server or some other forwarding device) on a mobile node's home network which tunnels datagrams for delivery to the mobile node when it is away from home, and maintains current location information for the mobile node.

Foreign Agent: A node (such as an access router or some other forwarding device) on a mobile node's visited network which provides routing services to the mobile node while registered. The foreign agent may de-tunnel and deliver datagrams to the mobile node that were tunneled by the mobile node's home agent. For datagrams sent by a mobile node, the foreign agent may serve as a default router for registered mobile nodes.

Care-of Address: The termination point of a tunnel toward a mobile node, for datagrams forwarded to the mobile node while it is away from home. Two different types of care-of address are: (1) a "foreign agent care-of address" is an address of a foreign agent with which the mobile node is registered, and a (2) "co-located care-of address" is an externally obtained local address which the mobile node has associated with one of its own network interfaces and is topologically correct (i.e., unicast routable by the normal internet routing system) at the FA.

Correspondent Node: A peer with which a mobile node is communicating. A correspondent node may be either mobile or stationary.

Foreign Network Any network other than the mobile node's Home Network.

Host Home Address: An (e.g., IP) address that is assigned for an extended period of time to a mobile node. It remains unchanged regardless of where the node is attached to the Internet. Therefore, it is an example of a "persistent" address.

Home Network: A network, possibly virtual, having a network prefix matching that of a mobile node's home address. Standard IP routing mechanisms will deliver unicast datagrams destined to a mobile node's Home Address to the mobile node's Home Network. The global multicast system will also already accept multicast packets sent via the home network when the packet source address is a home address from that home network.

Link: A facility or medium over which nodes can communicate at the link layer. A link underlies the network layer.

Link-Layer Address: The address used to identify an endpoint of some communication over a physical link. Typically, the Link-Layer address is an interface's Media Access Control (MAC) address.

Mobility Agent Either a home agent or a foreign agent.

Mobility Binding The association of a host home address with a care-of address, along with the remaining lifetime of that association.

Node: A host or a forwarding device, such as a router.

Tunnel: A path followed by a datagram while it is encapsulated. While it is encapsulated, a datagram is forwarded to a knowledgeable de-encapsulating agent, which de-encapsulates the datagram and then correctly delivers it to its ultimate destination. The tunnel source address is the address of the encapsulating agent and the tunnel destination address is the address of the decapsulating agent.

Virtual Network: A network with no physical instantiation beyond a node (e.g., router) (with a physical network interface on another network). The node (e.g., a home agent) generally advertises reachability to the virtual network using conventional routing protocols.

Visited Network: A network other than a mobile node's Home Network, to which the mobile node is currently connected.

§4.1 EXEMPLARY ENVIRONMENT

FIG. 1 illustrates an exemplary environment 100 in which the present invention may be used. As shown, a home network multicast system 120 and a foreign network multicast system 130 may exchange information via inter-network unicast facilities 150 and/or inter-network multicast facilities 160. The home network multicast system 120, the foreign network multicast system 130 and the inter-network multicast facilities 160 may define, or be a part of, a global multicast network

170. A mobile node 110, such as a wireless telephone or wireless personal digital assistant for example, has a persistent address (e.g., a host home address (HoA)) 115. This persistent address may be a globally unique address, such as an internet protocol (IP) address. The mobile node 110 can use its home network multicast system 120 via a home agent (HA) 125, which may also be the point at which the mobile node 110 accesses the network 120. For example, the home agent 125 may be an access router. An (e.g., wireless) access link 128 is provided between the mobile node 110 and the access node.

If the mobile node (MN) 110 leaves its home network area, as indicated by element 110', it may access the foreign network multicast system 130 via an access node, such as the access router 139. A wireless access link 138 is provided between the mobile node 110' and the access node. The access router 139 may include a foreign agent (FA) 135.

Notice that for purposes of multicasting, a multicast group may have a rendezvous point 174 (or 124 or 134) through which multicast packets are disseminated. Each network multicast system may have one or more multicast designated router 122, 132, which are used as multicast access routers through which to send and receive multicast packets for any multicast group supported by the multicast routing system.

The present invention may involve allowing the mobile node 110' to use foreign network multicasting while roaming (and therefore possibly changing access nodes) in a foreign network by allowing the mobile node 110' to use a persistent address (e.g., the host home address). In one embodiment, the present invention is realized by modifying the techniques described in RFC 3220 to allow such a persistent address to be used (e.g., without failing reverse path forwarding tests). Exemplary devices and methods that may be employed to this end are now described in §§4.2 and 4.3 below.

§4.2 EXEMPLARY DEVICES AND OPERATIONS

Figure 2:
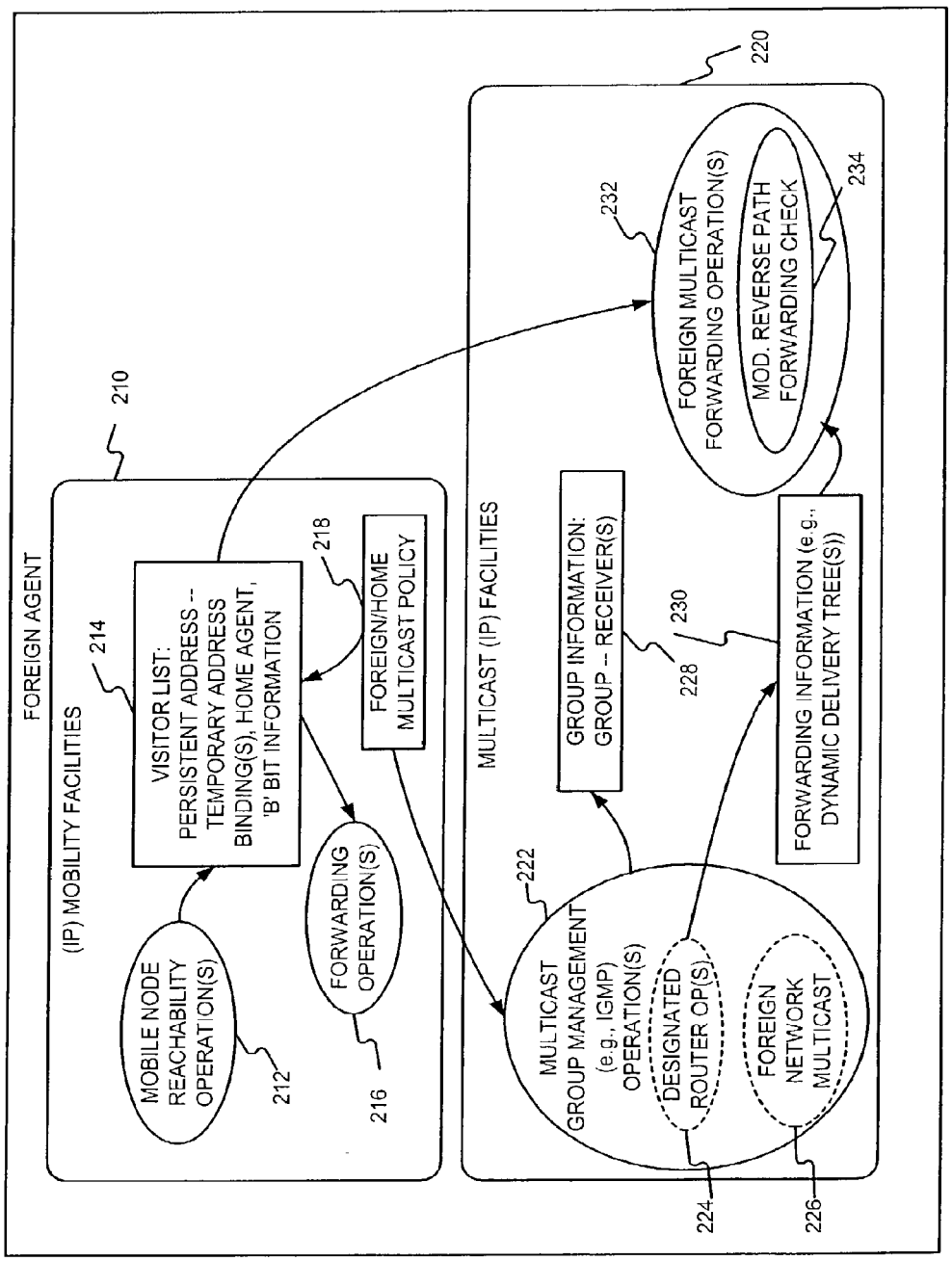
FIG. 2 is a block diagram of an exemplary foreign agent that may be used in the environment of FIG. 1.

FIG. 2 is a block diagram of an exemplary foreign agent 135' that may be used in the environment of FIG. 1 to permit a roaming mobile node—possibly having changing access points)—to use foreign network multicasting. As shown, the exemplary foreign agent 135' may include mobility facilities 210 and multicast facilities 220.

The mobility facilities 210 may include mobile reachability operation(s) 212 (such as MIP for example) and forwarding operations 216. Basically, the reachability operation(s) can be used to generate a visitor list 214 that may include entries binding a persistent address (e.g., a home address of a mobile node) with a temporary address (e.g., a CCoA or CoA). The visitor list 214 may also include an indication of whether or not packets are to be broadcast from the home network. A foreign multicast policy 218 may be predetermined or may be used to determine a type of multicasting the visiting mobile node is to use. This can be used to police the state of the 'B' bit and also control the forwarding of multicast signaling and data packets to and from the MN.

The multicast facilities 220 may include multicast group management operation(s) (e.g., IGMP) 222, which may include designated router operation(s) 224 and foreign network multicast operations 226, and multicast forwarding operations 232, which may include a modified reverse path forwarding check operation 234. The multicast group management operation(s) 222 may be used to generate group information 228 which may associate a multicast group with receivers registered to that multicast group. (This presumes IP multicasting where senders needn't join multicast groups. Naturally, the concepts of the invention can be extended to instances where senders join multicast groups.) If a designated router operation(s) 224 is provided, it may generate forwarding information 230, such as (a part of) a dynamic delivery tree for example.

Preferably, home or foreign multicasting is a decision controlled by mobility facilities 210 in conjunction with the mobile node 110' and the home agent 125, not by multicast facilities 220. The multicast facilities 220 in the foreign agent 135' are purely for foreign multicast. Home multicast may be effected using MIP by tunneling signaling (e.g., IGMP) and data packets to and from the home agent (HA) in either a MN<--> HA tunnel, or MN<--> FA<--> HA tunnels. The access router multicast module does not "see" home multicast signaling since it is encapsulated into a unicast packet and routed via the FA. The mobility facilities 210 can also include configuration information (not shown) to enable or block foreign multicast as well as home multicast. Hybrid multicast operation(s) (not shown) may, for example, allow multicast packets to be sent (tunneled) to the HA, but received via the FA.

Figure 3:
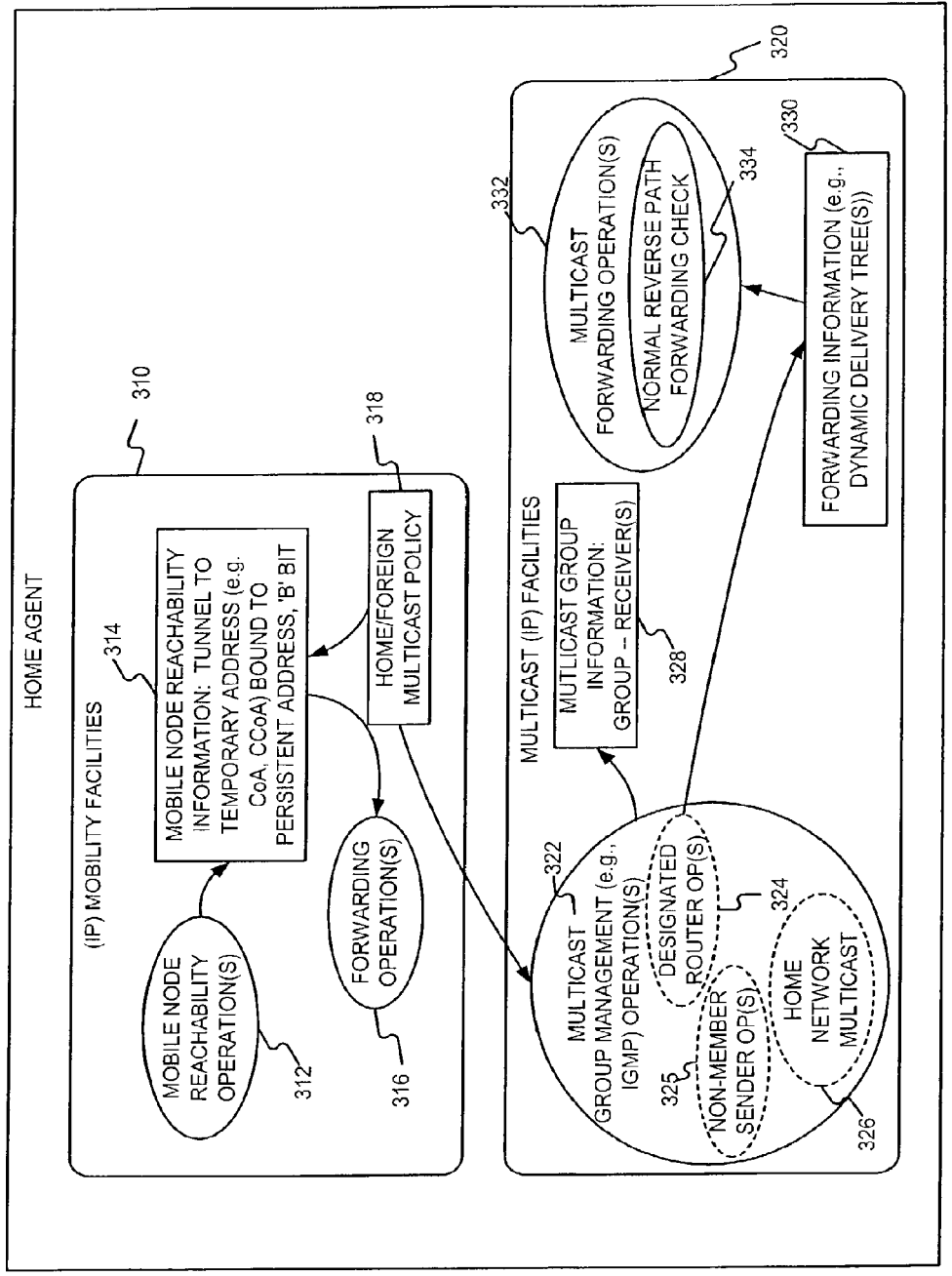
FIG. 3 is a block diagram of an exemplary home agent that may be used in the environment of FIG. 1.

FIG. 3 is a block diagram of an exemplary home agent 125' that may be used in the environment of FIG. 1 to permit a roaming mobile node—[possibly having changing access points)—to use foreign network multicasting. As shown, the exemplary home agent 125' may include mobility facilities 310 and multicast facilities 320.

The mobility facilities 310 may includes mobile node reachability operation(s) 312, which may be used to generate reachability information 314, as well as forwarding operations 316 that can use such reachability information 314. A home and foreign multicast policy 318 may be predetermined, or used for determinations, especially in conjunction with reachability operations 312 and forwarding operations 316. The reachability information 314 may include a tunnel to a temporary address (e.g., a CoA or CCOA) bound to a persistent (e.g., HoA) address, as well as a broadcast indicator (e.g., a "B" bit).

The multicast facilities 320 may include a multicast group management operation(s) (e.g., IGMP) 322, which may include a designated router operation(s) 324, non-group member sender operation(s) 325, and home network multicast operations 326, and multicast forwarding operations 332, which may include a reverse path forwarding check operation 334. (Note that a modified RPF check is not needed in the home agent because the HoA source address will pass a normal RPF check when injected into the home multicast system from the home agent. This is because the HoA is a local source address at the home agent and will therefore be available within its forwarding or routing tables.) The multicast group management operation(s) 322 may be used to generate group information 328 which may associated a multicast group with receivers registered to that multicast group. (This presumes IP multicasting where senders needn't join multicast groups. Naturally, the concepts of the invention can be extended to instances where senders do join multicast groups.) If a designated router operation(s) 324 is provided, it may generate forwarding information 330, such as (a part of) a dynamic delivery tree for example.

Figure 4:
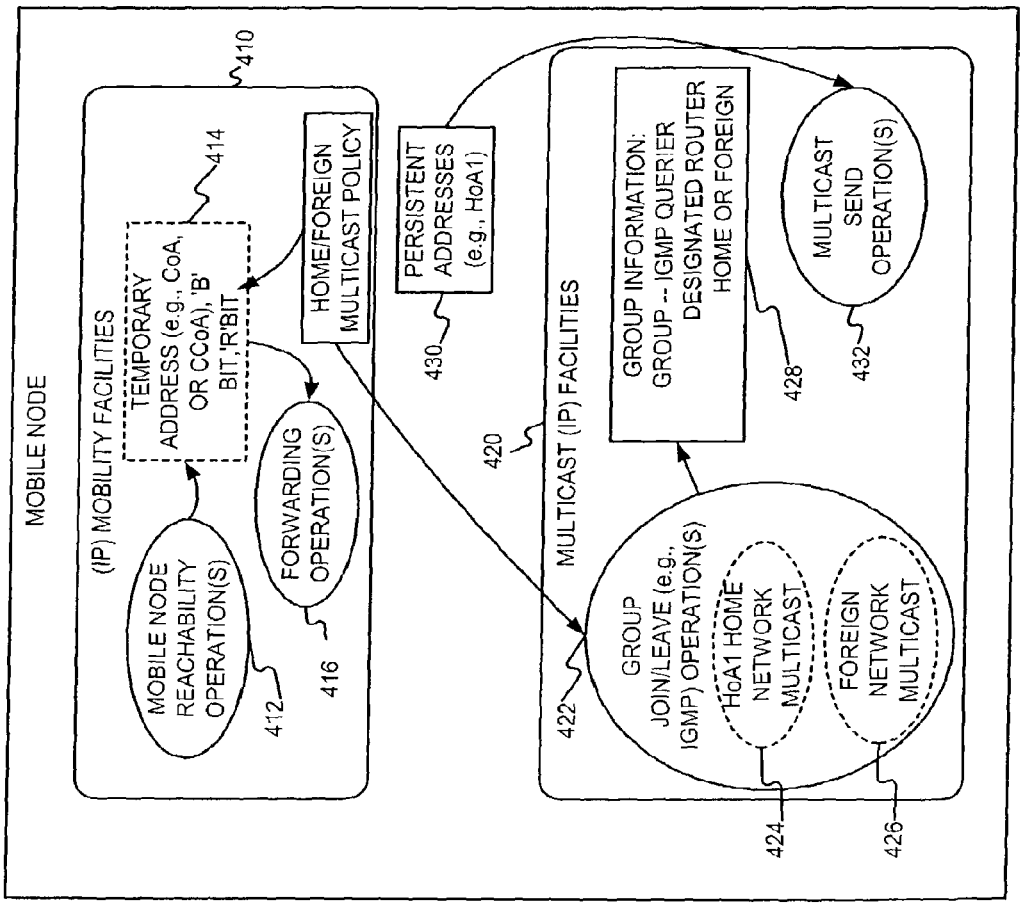
FIG. 4 is a block diagram of an exemplary mobile node that may be used in the environment of FIG. 1.

FIG. 4 is a block diagram of an exemplary mobile node that may be used in the environment of FIG. 1 to permit it, when roaming—possibly having changing access points)—to use foreign network multicasting. As shown, the exemplary mobile node 110" may include mobility facilities 410 and multicast facilities 420.

The mobility facilities 410 may include mobile node reachability operation(s) 412, which may be used to generate reachability information 414, as well as forwarding operations 416 that can use such reachability information 414. A home/foreign network multicast policy 418 may be predetermined, or used for determinations, especially in conjunction with reachability 412 and forwarding 416 operations. The reachability information 414 may include a temporary address (e.g., a CoA or CCOA), as well as a home agent broadcast indicator (e.g., a "B" bit) (HA to MN tunnel) and a reverse tunneling indicator (e.g., an "R" bit).

The multicast facilities 420 may include multicast group join/leave operation(s) (e.g., IGMP) 422, which may include home network multicast operation(s) 424 and foreign network multicast operation(s) 426, and multicast send operations 432.

In addition to an IGMP process and information for the foreign network multicast system, for each HoA/HA pair assigned to the mobile node 110" for which the MIP Registration sent to the HA has the B bit is set, and for which the MN receives IGMP Queries from that HA, the MN has an active home network multicast system. In addition, note that the multicast Send operation is different for home and foreign network multicast because the packet is sent unencapsulated for foreign multicast and encapsulated in home multicast, to either the FA or the HA.

Figure 5:
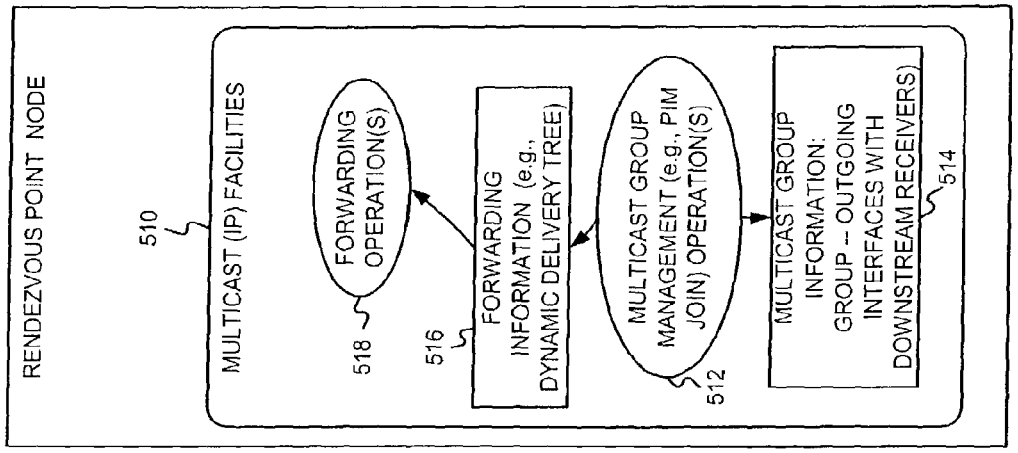
FIG. 5 is a block diagram of an exemplary rendezvous point node that may be used in the environment of FIG. 1.

FIG. 5 is a block diagram of an exemplary rendezvous point node 124'/134'/174' that may be used in the environment of FIG. 1. As indicated, the multicast group management operation(s) 512 doesn't need IGMP, but instead may use PIM multicast signaling (e.g., PIM JOIN). The mulitcast group management operation(s) 512 can be used to generate forwarding information 516, such as a dynamic delivery tree for example, that may be used by forwarding operations 518. Multicast group information 514, such as downstream receivers and interfaces, may also be provided.

Figure 12:
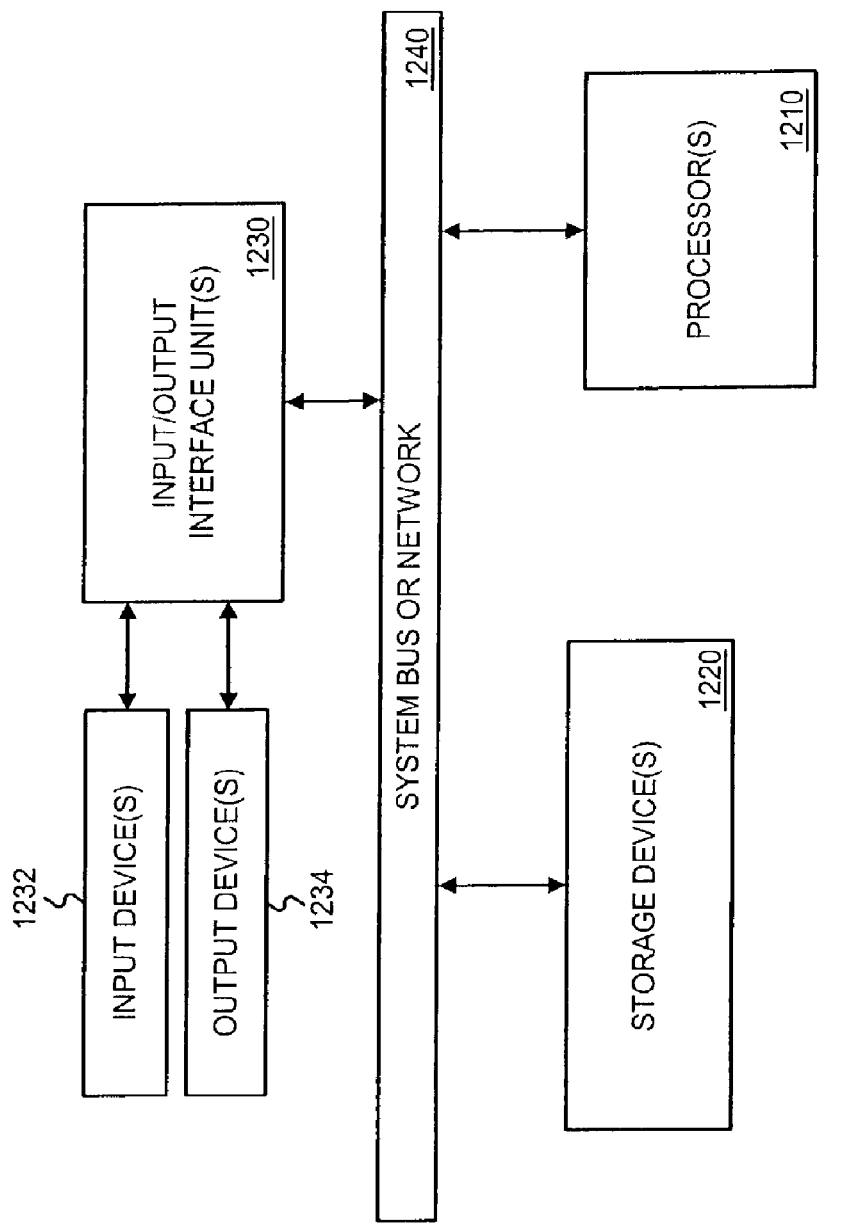
FIG. 12 is a block diagram of exemplary apparatus that may be used to effect a mobile node, an access router containing a foreign agent and/or IGMP Querier and/or Designated Router, a router or server containing a home agent, a router or server containing a rendezvous point, or various other nodes, such as hosts, access and core routers and servers.

FIG. 12 is a block diagram of exemplary apparatus that may be used to effect a mobile node, a foreign agent, a home agent, a rendezvous point, or various other nodes, such as access routers. The machine 1200 basically includes a processor(s) 1210, an input/output interface unit(s) 1230, a storage device(s) 1220, and a system bus(es) and/or a network(s) 1240 for facilitating the communication of information among the coupled elements. An input device(s) 1232 and an output device(s) 1234 may be coupled with the input/output interface(s) 1230. Operations of the present invention may be effected by the processor(s) 1210 executing instructions. The instructions may be stored in the storage device(s) 1220 and/ or received via the input/output interface(s) 1230. The instructions may be functionally grouped into processing modules.

The machine 1200 may be a host, server, router (or some other forwarding device) or a wireless communication device. The processor(s) 1210 may include a microprocessor, a network processor, and/or (e.g., custom) integrated circuit(s). In the exemplary router, the storage device(s) 1220 may include ROM, RAM, SDRAM, SRAM, SSRAM, DRAM, flash drive(s), hard disk drive(s), and/or flash cards. At least some of these storage device(s) 1220 may include program instructions. In a preferred embodiment, the methods of the present invention may be effected by a microprocessor executing stored program instructions (e.g., defining a part of a protocol module). At least a portion of the machine executable instructions may be stored (temporarily or more permanently) on the storage device(s) 1220 and/or may be received from an external source via an input interface unit 1230. Finally, in the exemplary router, the input/output interface unit(s) 1230, input device(s) 1232 and output device(s) 1234 may include interfaces to terminate communications links.

Exemplary methods that may be used to effect the foregoing operations are described in §4.3 below.

§4.3 EXEMPLARY METHODS AND DATA STRUCTURES

Figure 6:
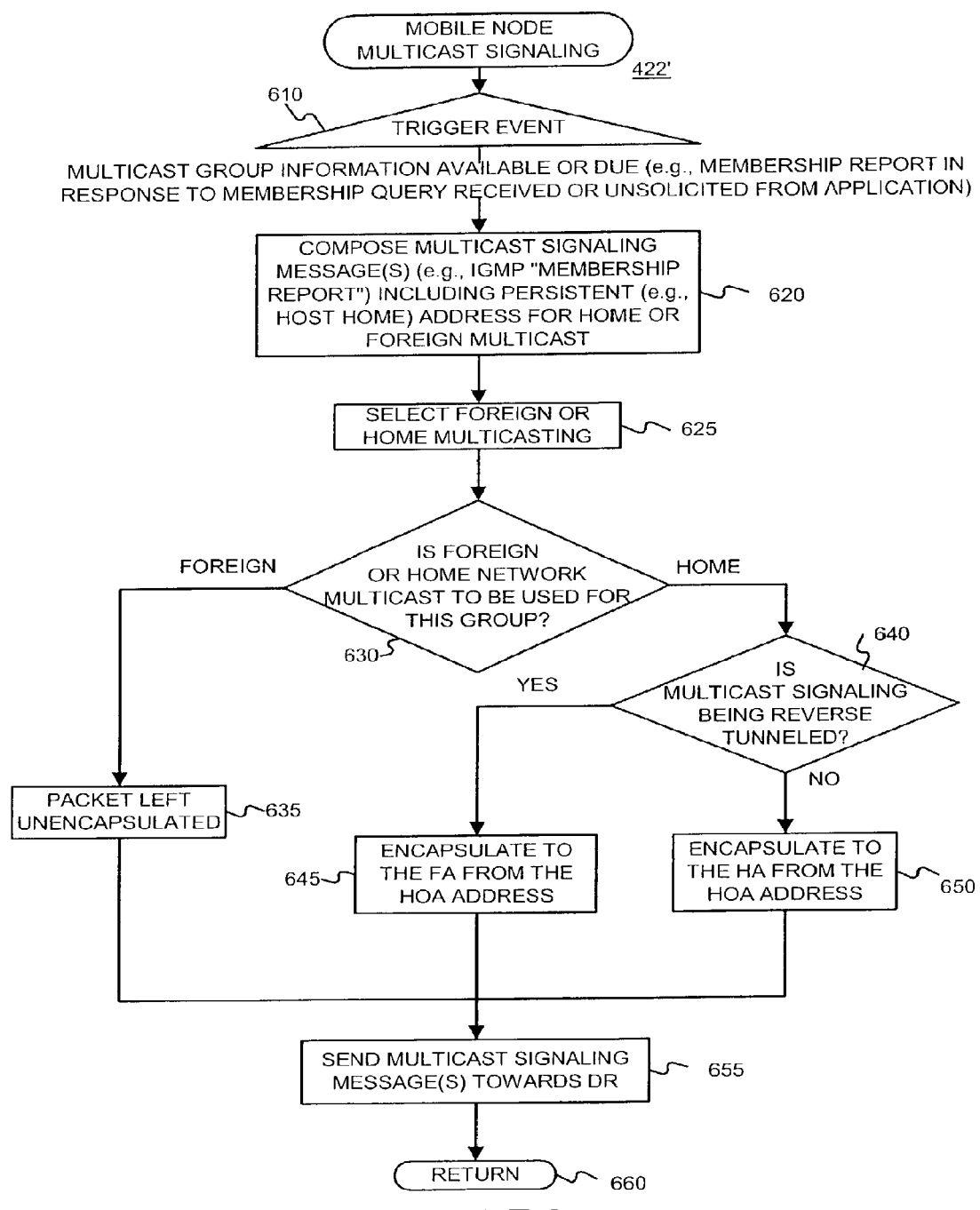
FIG. 6 is a flow diagram illustrating an exemplary method that may be used to effect multicast signaling operations at a mobile node.
Figure 13:
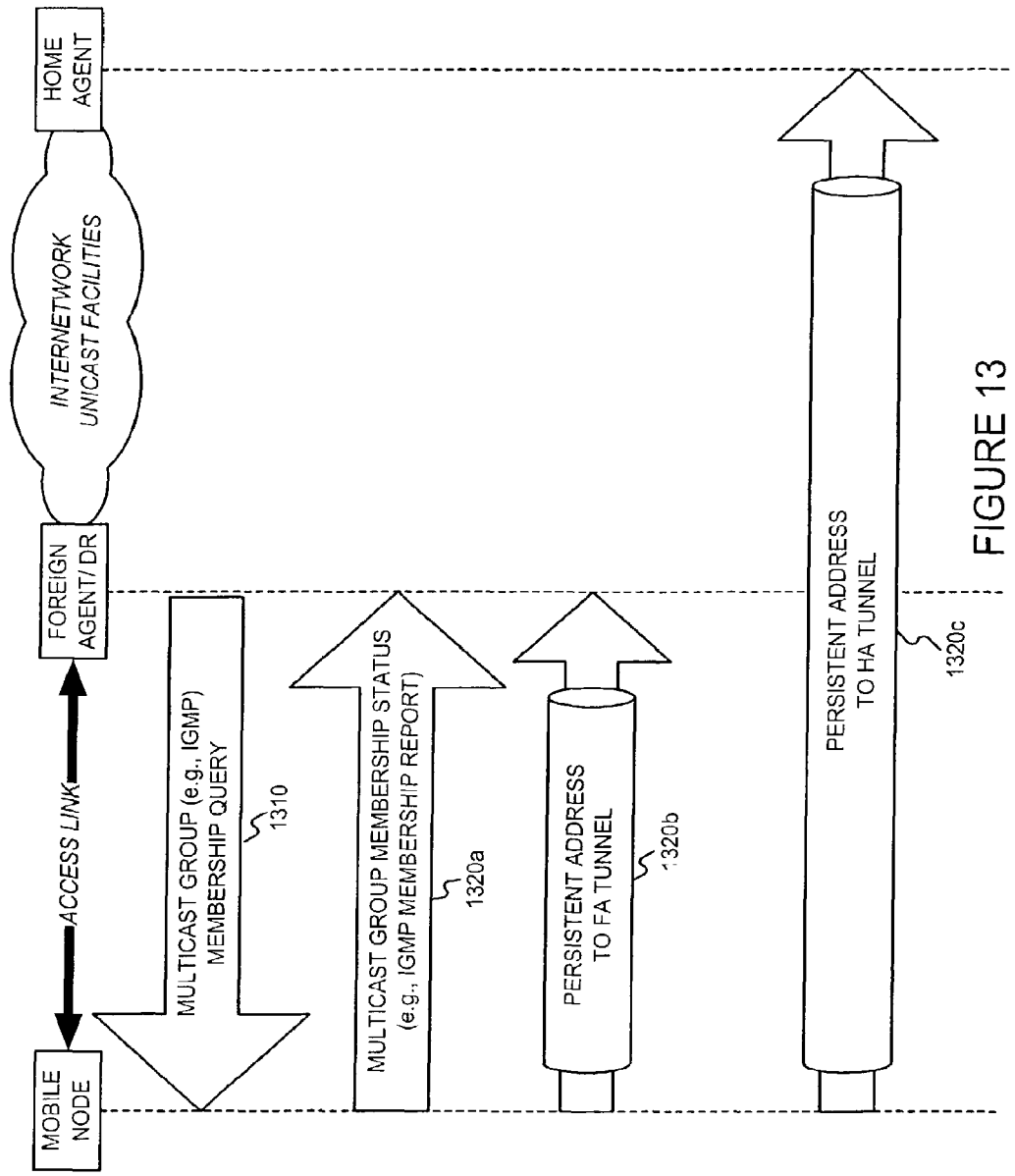
FIG. 13 is a messaging diagram of an example that illustrates multicast signaling can occur in the environment of FIG. 1, in accordance with the present invention.

FIG. 6 is a flow diagram illustrating an exemplary method 422' that may be used to effect multicast signaling operations 422 at a mobile node 110. As indicated by block 610, the main acts of the method 422' are performed in response to a trigger event, such as the need for multicast group information. (See, e.g., multicast group membership query message 1310 of FIG. 13.) As indicated by block 620, one or more multicast signaling messages are composed. This message(s) includes a persistent address of the mobile node (e.g., its HoA) to be used for home or foreign multicast. As indicated by block 625, foreign or home multicasting is selected. (An exemplary scheme for such a selection is described later with reference to FIG. 11.)

As indicated by decision block 630 and blocks 635 and 655, if foreign multicasting is selected, then the signaling message(s) (e.g., as packets) are sent towards the designated router, before the method 422' is left via RETURN node 660. (See, e.g., message 1320a of FIG. 13.)

Referring back to decision block 630, if home multicasting is selected, then, referring to decision block 640, it may be determined whether or not multicast signaling is being reverse tunneled. Referring to decision block 640 and blocks 645 and 655, if the multicast signaling is being reverse tunneled, then the signaling messages (e.g., as packets) are encapsulated to the foreign agent from the persistent (e.g., HoA) address of the mobile node, and sent towards the IGMP Querier, before the method 422' is left via RETURN node 660. (See, e.g., message 1320b of FIG. 13.) Referring to decision block 640 and blocks 650 and 655, if, on the other hand, the multicast signaling is not being reverse tunneled, then the signaling messages (e.g., as packets) are encapsulated to the home agent from the persistent (e.g., HoA) address of the mobile node, before the method 422' is left via RETURN node 660. (See, e.g., FIG. 1320c of FIG. 13.) Note that the mobile node need not be aware of the hybrid method of supporting foreign multicast in the access router whereby the access router forwards to the home agent.

Figure 7:
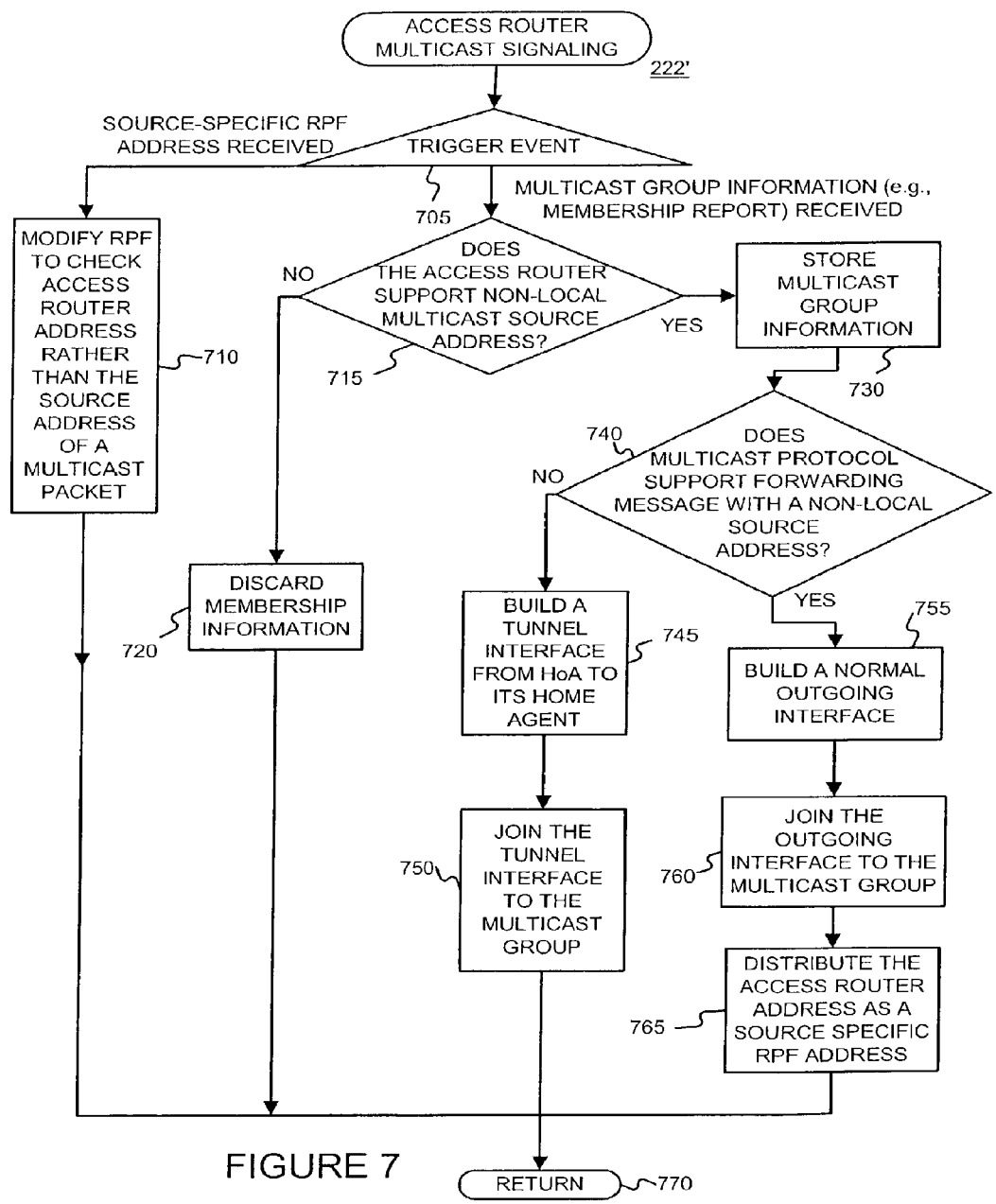
FIG. 7 is a flow diagram illustrating an exemplary method that may be used to effect multicast signaling operations at an access router containing a foreign agent.

FIG. 7 is a flow diagram illustrating an exemplary method 222' that may be used to effect multicast signaling operations at an access router, which may be (or include) a foreign agent and also includes the equivalent of an IGMP Querier. As indicated by trigger block 705 and block 710, if the access router receives a "source specific reverse path forwarding address" message, it modifies its RPF to check the access router address, rather than the source address of a multicast packet. Referring back to trigger block 705, if multicast group information (e.g., an IGMP membership report) is received, then the method 222' proceeds to decision block 715. At decision block 715, it is determined whether or not the access router supports non-local multicast source addresses. If not, the membership information is discarded, as indicated by block 720, before the method 222' is left via RETURN node 770. Note that this discard operation can also be undertaken for a specific MN based on the multicast policy for that MN and its HA (i.e., foreign multicast barred, or a lack of support in the HA for hybrid mode). If, on the other hand, the access router supports non-local multicast source addresses for this MN, the multicast information is stored as indicated by block 730, before the method 222' proceeds to decision block 740. At decision block 740, it is determined whether the multicast facilities at the access router support forwarding messages with a non-local source address. If forwarding of non-local source address messages is not supported, then a tunnel interface is built from the persistent address (e.g., HoA) of the mobile node to its home agent as indicated by block 745, and the tunnel interface is joined to the multicast group as indicated by block 750, before the methods 222' is left via RETURN node 770. Referring back to decision block 740, if, on the other hand, non-local source address messages are supported, then a normal outgoing interface for this multicast protocol is built, this interface is joined to the multicast group, and the access router address is distributed as a source specific reverse path forwarding address, as indicated by blocks 755, 760 and 765, before the method 222' is left via RETURN node 770. Note that the JOIN is sent so that local receivers can get incoming multicast packets from the core of the network. The incoming interface is added so that the subnet from which the IGMP message was sent will get a copy of any such packets received at the access router. Note that if each MN independently sends its own IGMP messages, then each IGMP will create a tunnel to the HA for each HoA of that MN. If instead IGMP suppression is used on the wireless subnet at the access router, to enable only one MN to have to signal membership on each group for all MNs on that subnet, then each IGMP message creates an interface for that group shared by all MNs for all their HoAs and HA pairs. In either case, the interface accesses MIP state to determine the correct HA address for each arriving multicast data packet sent by a MN from a specific HoA address to be forwarded to the specific HA at which that HoA is local.

Figure 8:
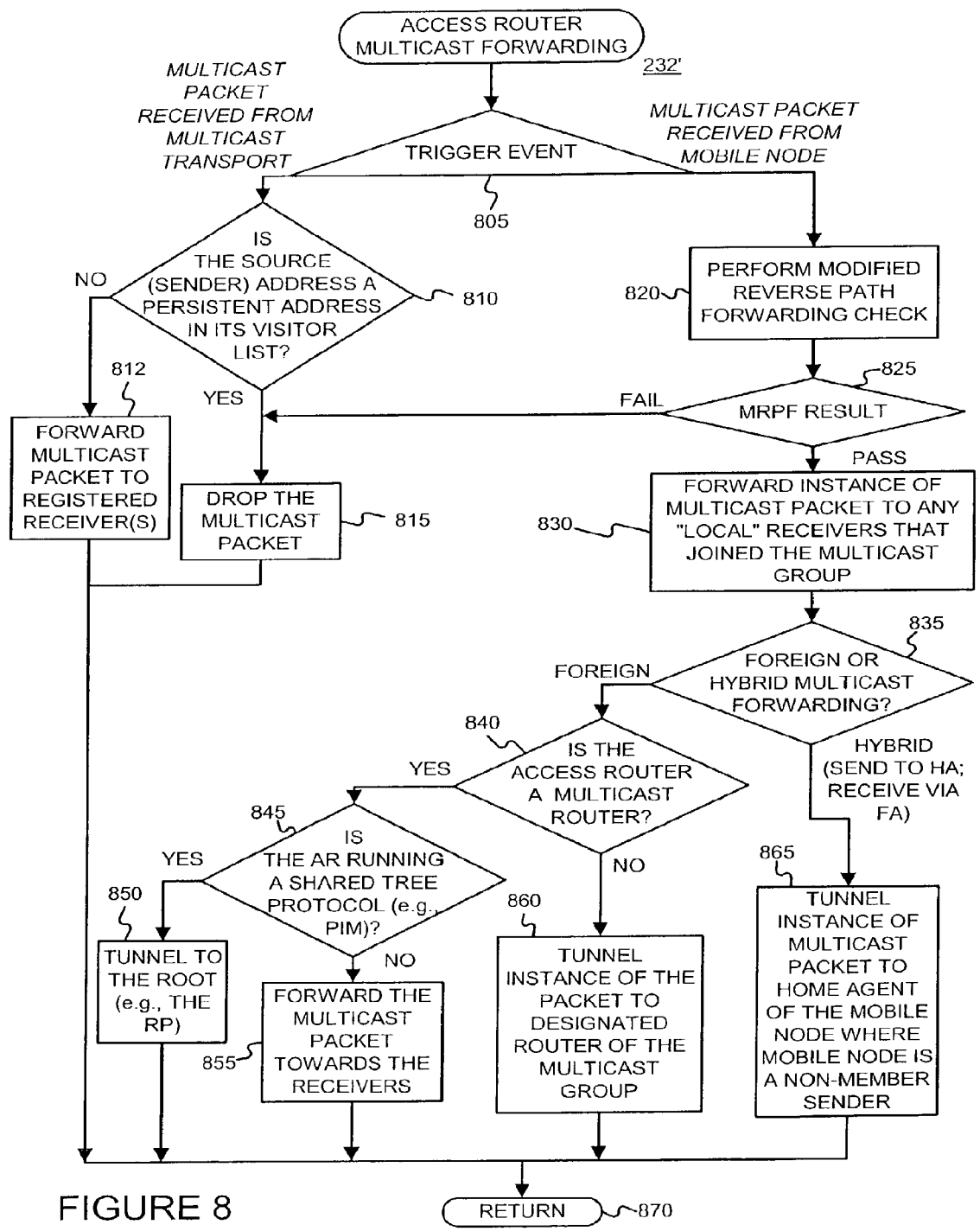
FIG. 8 is a flow diagram illustrating an exemplary method that may be used to effect multicast forwarding operations at an access router containing a foreign agent.
Figure 14:
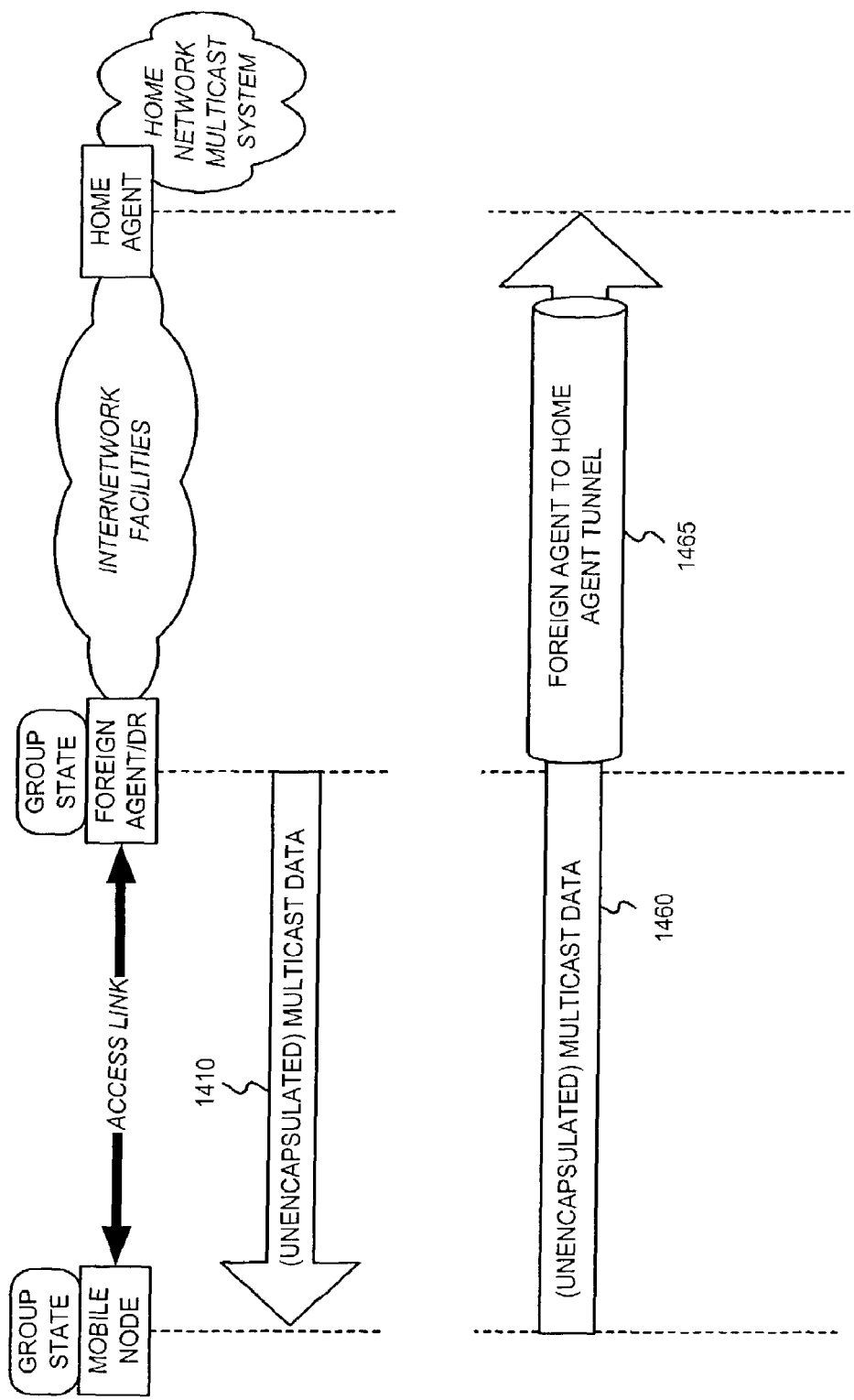
FIGS. 14-16 are messaging diagrams of examples that illustrate alternative ways of multicast forwarding in the environment of FIG. 1, in accordance with the present invention.
Figure 15:
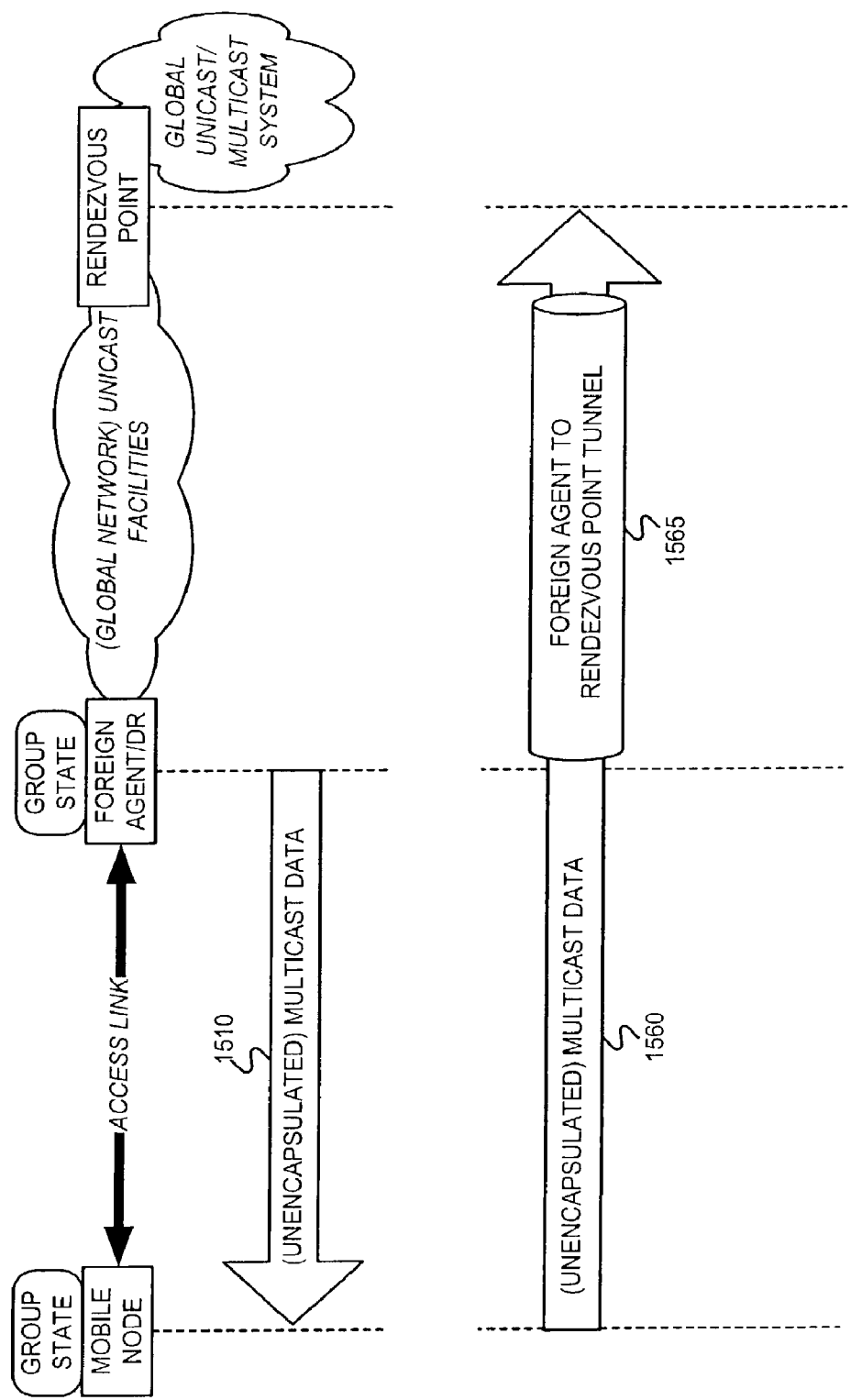
Figure 16:
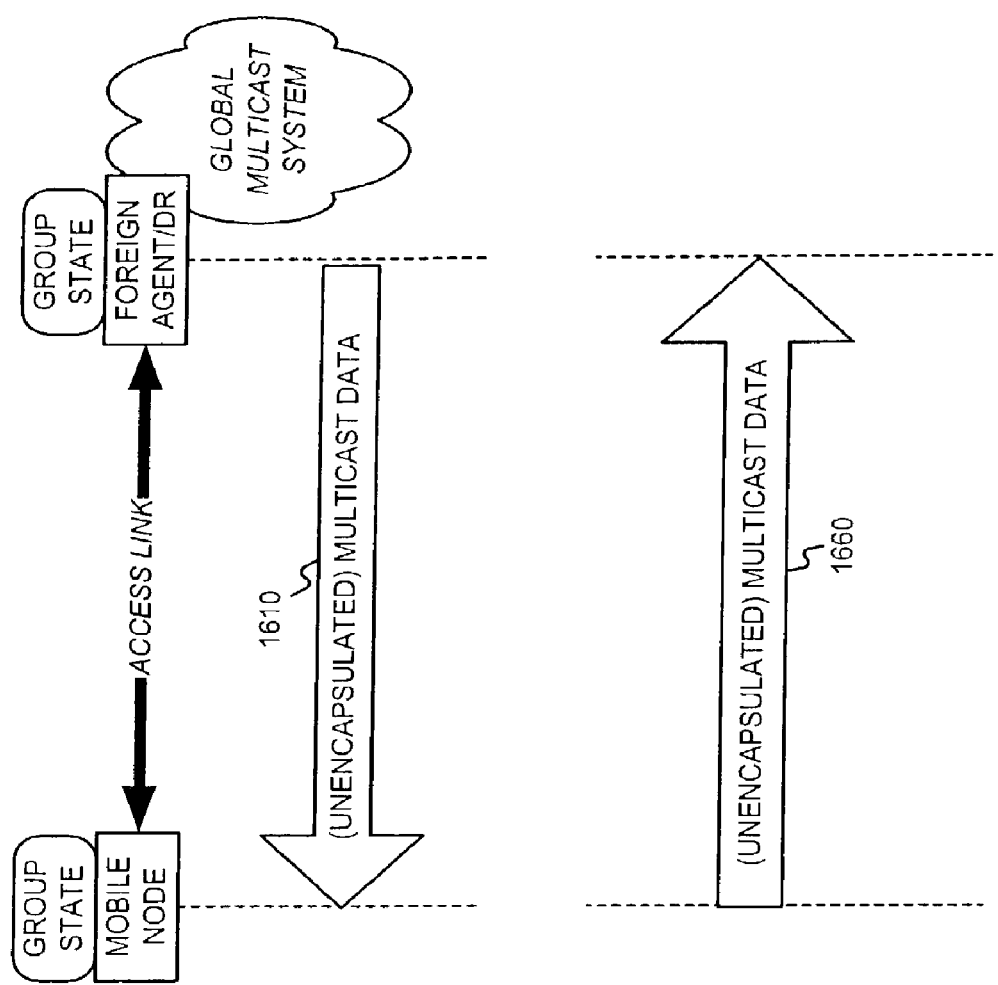

FIG. 8 is a flow diagram illustrating an exemplary method 232' that may be used to effect multicast forwarding operations at an access router (which may be or include a foreign agent). As indicated by trigger block 805, if a multicast packet is received from multicast transport, the method 232' proceeds to decision block 810. At decision block 810, it is determined whether or not the source (sender) address of the multicast packet is a persistent address in its visitor list. If not, the packet is forwarded to receivers registered with the multicast group as indicated by block 812 before the method 232' is left via RETURN node 870. (See, e.g., communications 1410, 1510 and 1610 of FIGS. 14, 15 and 16, respectively.) If, on the other hand, the source address matches a persistent address in its visitor list, the packet is dropped as indicated by block 815, before the method 232' is left via RETURN node 870. (This is because local multicast forwarded will have already been performed.)

Referring back to trigger event block 805, if a multicast packet is received from a mobile node, a modified reverse path forwarding check is performed. This is because the persistent address of the mobile node will not be a local address of the access router (e.g., in its unicast forwarding or routing tables). In this modified RPF check, it is determined if the multicast source address matches an address in the visitor list. As indicated by decision block 825 and block 815, if the modified RFP check fails, the multicast packet is dropped, before the method 232' is left via RETURN node 870. If, on the hand, the modified RPF check passes, an instance (copy) of the multicast packet is forwarded to any "local" receivers that joined the multicast group as indicated by block 830. Then, at decision block 835, it is determined whether or not the multicast forwarding is to be foreign or hybrid. (Note that hybrid multicasting means that multicast packets are sent to the home agent (HA) for the home multicast system and received via the foreign agent (FA) and the foreign multicast system. If it is to be hybrid, an instance (copy) of the multicast packet is tunneled to the home agent of the mobile node (where the mobile node is a non-member sender), as indicated by block 865, before the method 232' is left via RETURN node 870. (See, e.g., 1460 and 1465 of FIG. 14.) If, on the other hand, the foreign network multicasting is to be used, the method 232' proceeds to decision block 840 where it is determined whether or not the access router is a multicast router. If no, an instance (copy) of the packet is forwarded (e.g., tunneled) to the local designated router (DR) of the multicast group, before the method 232' is left via RETURN node 870. This is useful in the case that the Access Router is an IGMP proxy instead of a full multicast router. Referring back to decision block 840, if, on the other hand the access router is a multicast router, then it may be determined whether or not the access router is running the PIM-SM protocol, as indicated by decision block 845. If the access router is running a shared tree protocol (such as PIM-SM), then, as indicated by block 850, an instance (copy) of the multicast packet is tunneled to the root of the tree (the rendezvous point node in PIM-SM), before the method 232' is left via RETURN node 870. (See, e.g., 1560 and 1565 of FIG. 16.) This enables non-local source addresses to be supported even when the multicast routers in the multicast system are not able to RPF to the DR. If, on the other hand, the access router is not running a shared tree protocol, as indicated by block 855, then the multicast protocol distributes the DR address and RPF to that DR. Therefore, the multicast packets are simply forwarded towards the receivers registered to the multicast group, before the method 232' is left via RETURN node 870. (See, e.g., 1660 of FIG. 16.)

Note that modified reverse path forwarding (RPF) checks can be performed in a number of ways. For example, in a first way, the source address is checked to see if it is a local address according to the unicast routing table, or is on the MIP visitor list, before the packet is multicast. In a second way, the source address is checked to see if it is on the visitor list. If so, an indicator is set to bypass the normal RPF multicast check when the packet is passed to the multicast forwarding engine; otherwise the normal RPF multicast check is performed. In a third way, "RPF-like" mobile IP filtering is performed in the multicast forwarding engine and it is determined whether or not the interface that the packet came in on is a wireless interface (or for a mobile service). If not, a normal RPF multicast check is performed. Otherwise, it is only checked to see if the source address is on the visitor list.

Figure 9:
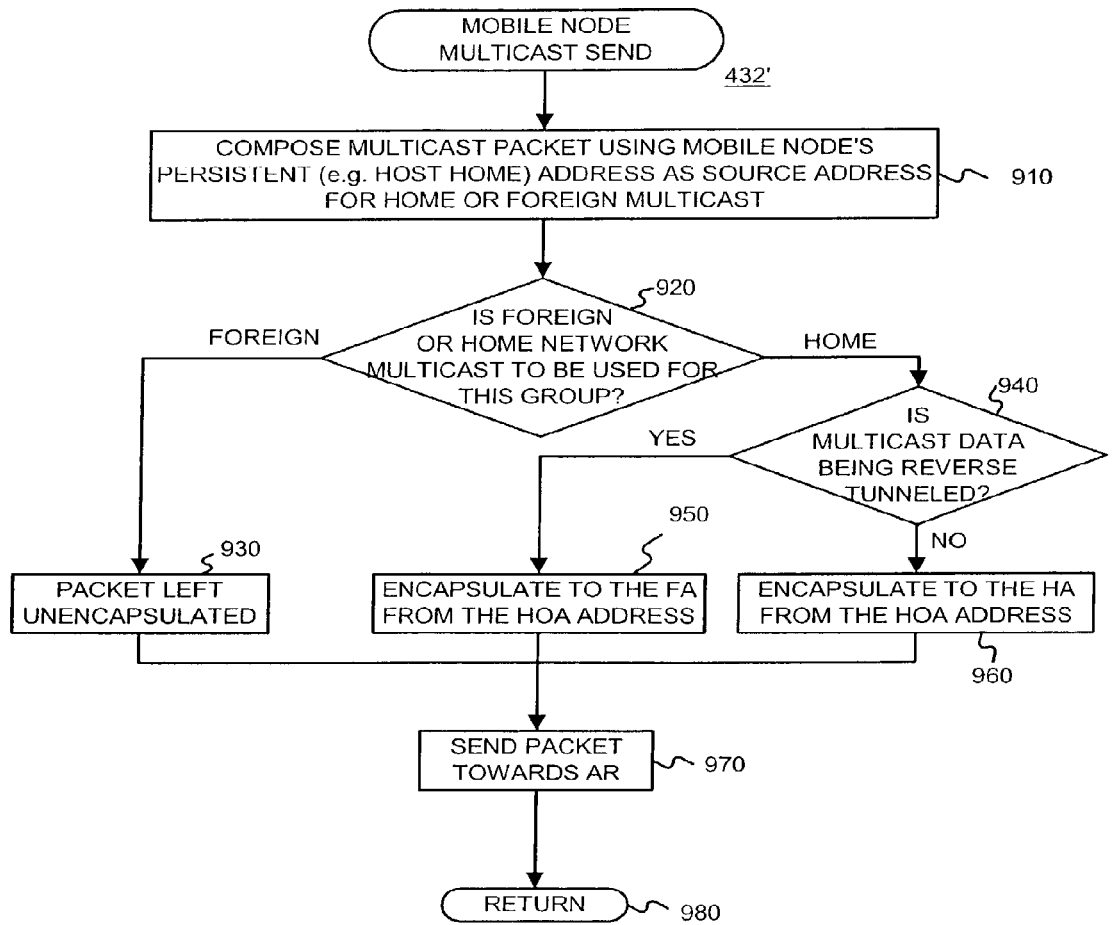
FIG. 9 is a flow diagram illustrating an exemplary method that may be used to effect multicast forwarding operations at a mobile node.

FIG. 9 is a flow diagram illustrating an exemplary method 432' that may be used to effect multicast forwarding operations at a mobile node. As indicated by block 910, a multicast packet, using the mobile node's persistent address (e.g., its HoA) as a (IP layer 3) source address is composed. As indicated by decision block 920, it is determined whether foreign or home network multicast is to be used for this multicast group. (This determination may be made using the method described with reference to FIG. 11 below.) If foreign multicasting is to be used, the multicast packet is simply sent towards the (foreign network) access router, as indicated by block 970. That is, the packet is left unencapsulated as indicated by block 930. Referring back to decision block 920, if home multicasting is to be used, as indicated by decision block 940, it may be determined whether or not multicast data is being reverse tunneled. If so, as indicated by blocks 950 and 970, the multicast packet(s) to be sent is encapsulated to the foreign agent from the mobile node's persistent (e.g., HoA) address, before the packet is sent. The method 432' may then be left via RETURN node 980. If the multicast data is not being reverse tunneled, then, as indicated by blocks 960 and 970, the multicast packet(s) to be sent is encapsulated to the home agent from the mobile node's persistent (e.g., HoA)

address, before the packet is sent. The method 432' may then be left via RETURN node 980.

Figure 10:
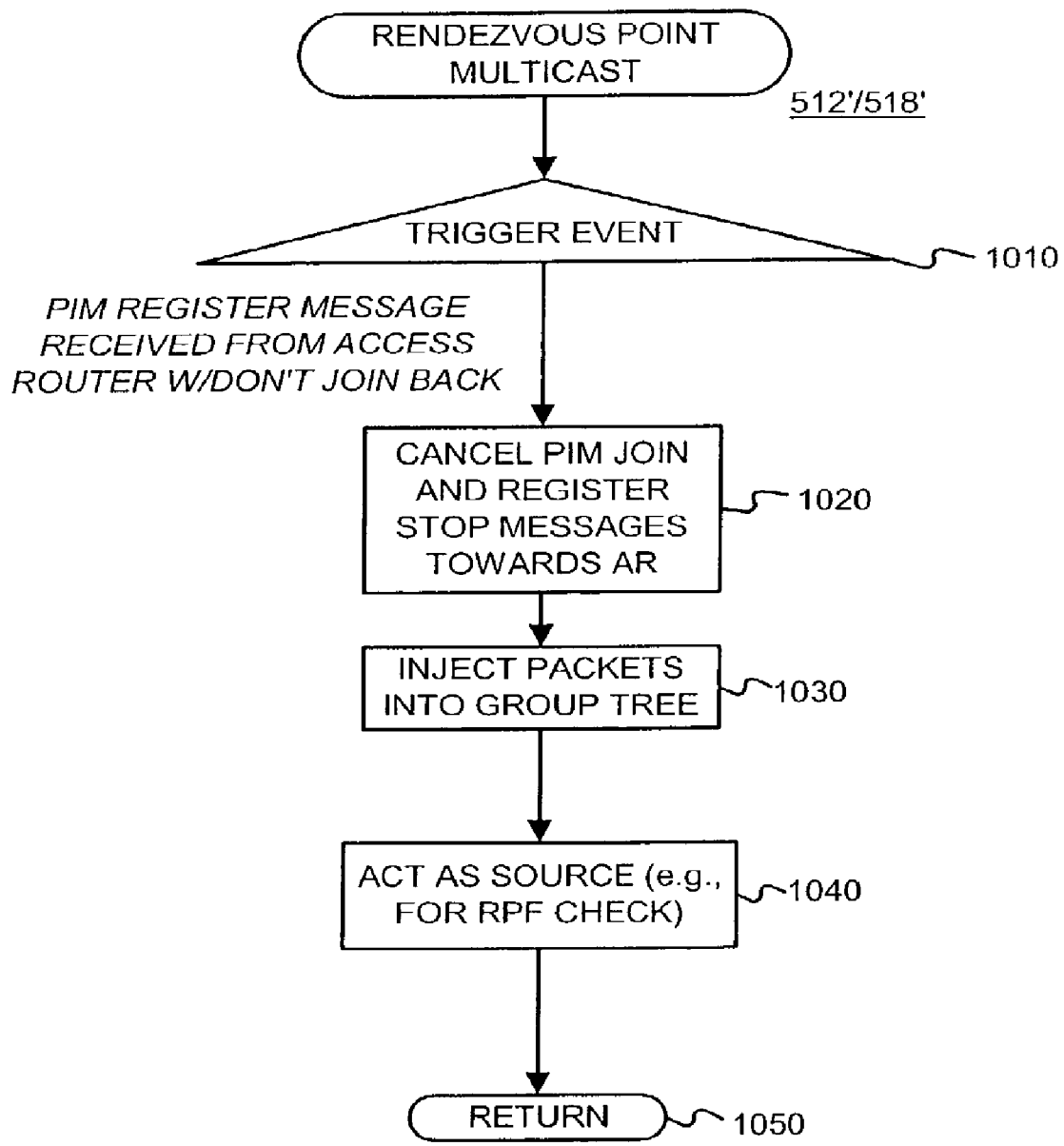
FIG. 10 is a flow diagram illustrating an exemplary method that may be used to effect multicast forwarding and signaling operations at a rendezvous point node.

FIG. 10 is a flow diagram illustrating an exemplary method 512'/518' that may be used to effect multicast forwarding and signaling operations at a PIM-SM rendezvous point node (or similar such shared tree root node). As indicated by trigger block 1010, the main part of the method 512'/518' is invoked in response to a PIM register message received from an access router, with a 'Don't Join Back' indication. As indicated by blocks 1020, 1030 and 1040, respectively, PIM join is canceled towards the access router, along with the associated Register Stop message, the packet(s) are injected into the multicast group tree, and the rendezvous point acts as a source (e.g., for purposes of a reverse path forwarding check).

Figure 11:
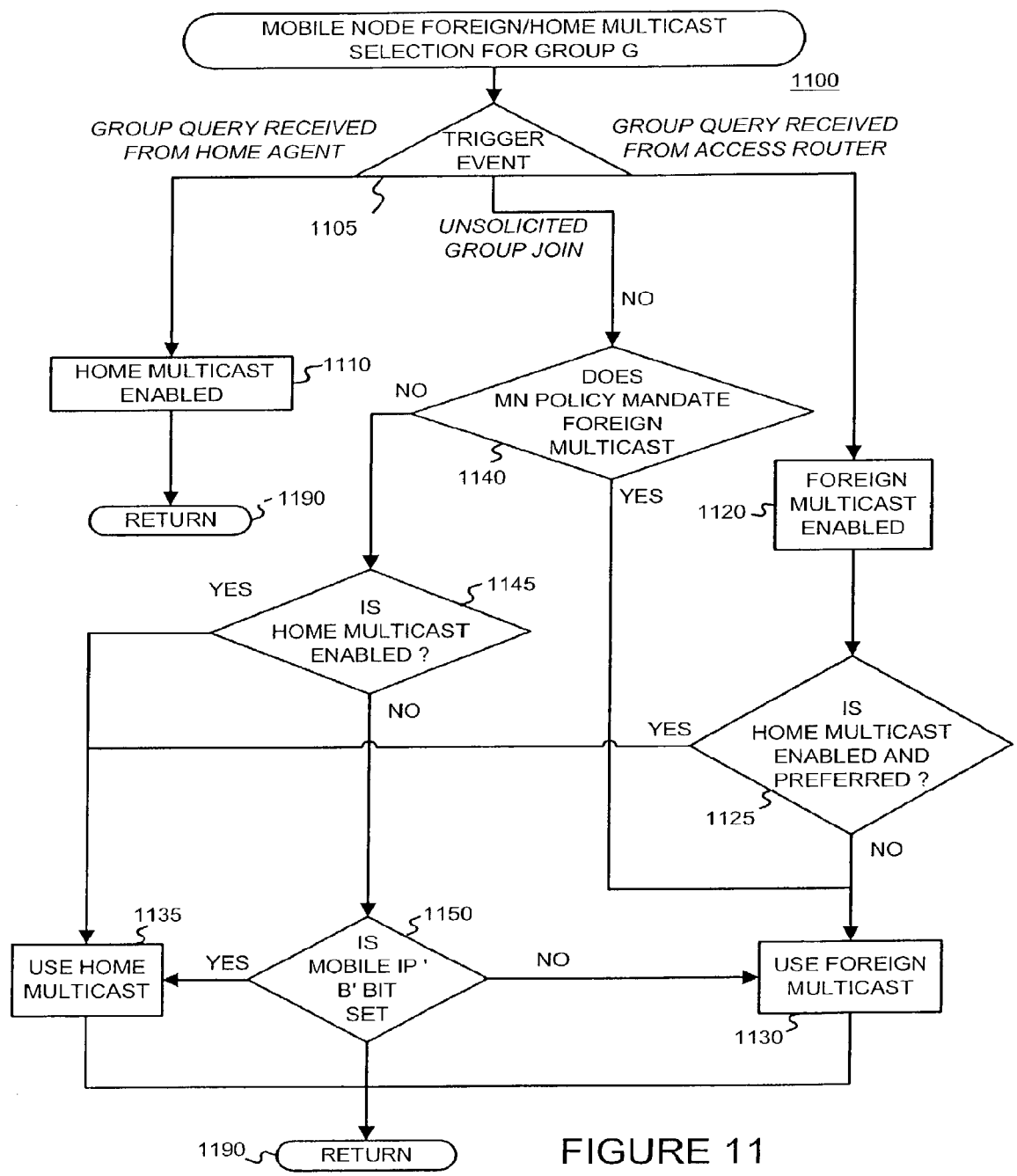
FIG. 11 is a flow diagram illustrating an exemplary method that may be used by a MN to select a multicasting method for a given multicast group.

Finally, recall from FIG. 6 that the mobile node may determine whether it will use its home network multicasting, or foreign network multicasting, for a given multicast group. FIG. 11 is a flow diagram illustrating an exemplary method 1100 that may be used to select a multicasting method for a given multicast group. Referring to trigger block 1105 if an IGMP query is receive from the mobile node's home agent, then, as indicated by block 1110, the mobile node may enable home network multicasting. Referring back to trigger block 1105, if an IGMP query is received from an access router, foreign multicast is enabled as indicated by block 1120. Then, as indicated by decision block 1125, if home multicast is enabled and preferred, home multicast is used as indicated by block 1135, otherwise foreign multicast is used as indicated by block 1130. Referring back to trigger event 1105, if the mobile node wants to perform an unsolicited joint to the multicast group (not in response to, or due to a lack of, a membership query), then as indicated by decision block 1140, it is determined whether or not the mobile node's own policy mandates foreign multicast. If so, foreign multicast is used as indicated by block 1130. If not, as indicated by decision block 1145, it is determined whether or not home multicast is enabled. If so, home multicast is used as indicated by block 1135, otherwise the method 1100 proceeds to decision block 1150. As indicated by decision block 1150 and blocks 1130 and 1135, if the "B" bit is set, home multicast is used, otherwise, foreign multicast is used. This exemplary method 1100 ensures that the state of the "B" bit acts as the default selector for the selection of home or foreign multicast, which can be overruled by additional policy and by the status of received IGMP Queries.

§4.4 CONCLUSIONS

As can be appreciated from the foregoing, the present invention permits a mobile host to roam in a foreign network, with multiple access node handoffs, while permitting foreign network multicasting. Moreover, using the HoA as the source address for IGMP membership reports and multicast packets unifies, for both unicast and multicast, most of the host processing for both mobile and non-mobile hosts as the source addresses are now always the same.

What is claimed is:

1. A processor for use in a mobile node of a communications system including:
    a first network system serving as a home network for a mobile node and including a first mobility agent which is coupled to a home network multicast system, and
    a second network system, said second network system including said access node and a foreign network multicast system, the access node including:
        a second mobility agent, and
        a multicast facility;
    the processor being configured to control the mobile node to implement a communications method, the method comprising:
        a) submitting a signaling message, from the mobile node, to the multicast facility of the access node for joining a multicast data communications group in the foreign network multicast system; and
        b) sending, from the mobile node, unencapsulated multicast data to the multicast data communications group, via the access node, using a source address that is not local to the second, visited, network system.

2. The method of claim 1, wherein the source address is a persistent address.

3. The method of claim 1, wherein the source address is a host home address.

4. A non-transitory computer readable medium including machine executable instructions for controlling a mobile node to implement a communications method while in a communications system, the communications system including:
    a first network system serving as a home network for a mobile node and including a first mobility agent which is coupled to a home network multicast system, and
    a second network system, said second network system including said access node and a foreign network multicast system, the access node including:
        a second mobility agent, and
        a multicast facility;
    the communications method comprising:
        a) submitting a signaling message, from the mobile node, to the multicast facility of the access node for joining a multicast data communications group in the foreign network multicast system; and
        b) sending, from the mobile node, unencapsulated multicast data to the multicast data communications group, via the access node, using a source address that is not local to the second, visited, network system.

5. The non-transitory computer readable medium of claim 4, wherein the source address is a persistent address.

6. The non-transitory computer readable medium of claim 4, wherein the source address is a host home address.

7. A processor for use in an access node, the access node being for use with a communications system including
    a mobile node,
    a first network system serving as a home for the mobile node and including a first mobility agent and a home network multicast system, and
    a second, visited, network system including said access node and a foreign network multicast system,
    the processor being configured to control the access node to implement a method comprising:
        a) accepting multicast group information, including a non-local address, from the mobile node; and
        b) storing the multicast group information to be used for the reception of multicast data from the foreign network multicast system.

8. The processor of claim 7, wherein the access node has an address, the processor being further configured to:
    c) distribute, from the access node, the address of the access node as a source-specific reverse path forwarding address.

9. The processor of claim 7, wherein the processor is further configured to control the access node to perform the steps of:

c) accept a multicast packet from the mobile node; and
d) determine whether or not to forward the multicast packet based on mobility information, related to the mobile node, and used by the access node.

10. A non-transitory computer readable medium including machine executable instructions for controlling an access node in a communications system to implement a communications method, the communications system including:
   a mobile node,
   a first network system serving as a home for the mobile node and including a first mobility agent, and
   a second, visited, network system including an access node, the communications method comprising:
   a) accepting multicast group information, including a non-local address, from the mobile node;
   b) storing the multicast group information
   c) accepting a multicast packet from the mobile node;
   d) determining whether or not to forward the multicast packet based on mobility information, related to the mobile node, and used by the access node,
   wherein the step of determining whether or not to forward the multicast packet includes:
   i) determining whether a source address of the multicast packet is on a visitor list; and
   ii) if it is determined that the source address of the multicast packet is on the visitor list, considering the multicast packet to have passed a reverse path forwarding check, despite the fact that the source address is a non-local address.

11. The non-transitory computer readable media of claim 10, wherein the communications method further comprises:
   e) if the access node is a multicast router running a shared tree protocol specifying a shared tree having a root, then tunneling the accepted multicast packet to the root of the tree.

12. An access node for use in a multicast communications system, the access node comprising:
   a) multicast facility support means for supporting multicast operations including multicast establishment and forwarding operations; and
   b) mobility facility support means for supporting roaming to, and multicast connectivity at said access node, of a mobile end node, wherein the mobile end node uses a non-local address for the reception of local multicast data from other nodes in a foreign network multicast system, said non-local address corresponding to a home network.

13. The access node of claim 12, wherein the non-local address used by the mobile node is a Mobile Internet Protocol home address.

14. The access node of claim 12 further comprising:
   c) wireless interface means for effecting a wireless link with the mobile node.

15. The access node of claim 12 further comprising:
   c) interface means for coupling the access node to another node, the another node including a multicast routing and forwarding process.

16. An access node for use in a multicast communications system, the access node comprising:
   a) multicast facility support means for supporting multicast operations including multicast establishment and forwarding operations;
   b) mobility facility support means for supporting the roaming to, and multicast connectivity at said access node, of a mobile end node, wherein the mobile end node uses a non-local address for local multicast services;
   c) memory means including a stored set of available mobility state information and a stored set of available multicast state information; and
   d) means for correctly forwarding multicast data from the mobile node into a multicast system, despite the fact that the source address of the multicast packets are not local to the access node, using the set of available mobility state information.

17. The access node of claim 16, wherein said mobility facility support means supports Mobile Internet Protocol signaling.

18. A mobile node belonging to a first network system and having a home agent in the first network system, for use in a multicast communications system of a second, visited, network system including a foreign network multicast system and an access node, said access node including:
   a foreign mobility agent, and
   a multicast facility,
   the mobile node comprising:
   a) a signaling generation module for generating a signaling message to the multicast facility of the access node for joining a multicast data communications group at the foreign network multicast system;
   b) a multicast data generation module for generating multicast data to the multicast data communications group, using a multicast source address that is not local to the second, visited, network system; and
   c) a transmitter for transmitting the signaling message and the multicast data to the access node.

19. The mobile node of claim 18, wherein the source address is a persistent address.

20. The mobile node of claim 18, wherein the source address is a host home address.

21. A method of operating a mobile node belonging to a first network system and having a home agent in the first network system, for use in a multicast communications system of a second, visited, network system including a foreign network multicast system and an access node that includes a foreign mobility agent and a multicast facility, comprising:
   generating a signaling message to the multicast facility of the access node for joining a multicast data communications group at the foreign network multicast system;
   generating multicast data to the multicast data communications group, using a multicast source address that is not local to the second, visited, network system; and
   transmitting the signaling message and the multicast data to the access node.

22. A mobile node belonging to a first network system and having a home agent in the first network system, for use in a multicast communications system of a second, visited, network system including a foreign network multicast system and an access node that includes a foreign mobility agent and a multicast facility, comprising:
   means for generating a signaling message to the multicast facility of the access node for joining a multicast data communications group at the foreign network multicast system;
   means for generating multicast data to the multicast data communications group, using a multicast source address that is not local to the second, visited, network system; and
   means for transmitting the signaling message and the multicast data to the access node.

23. A non-transitory computer-readable medium containing instructions stored thereon, which, when executed by a mobile node belonging to a first network system and having a home agent in the first network system, for use in a multicast communications system of a second, visited, network system including a foreign network multicast system and an access node that includes a foreign mobility agent and a multicast facility, cause the mobile node to perform operations, the instructions comprising:

program code to generate a signaling message to the multicast facility of the access node for joining a multicast data communications group at the foreign network multicast system;

program code to generate multicast data to the multicast data communications group, using a multicast source address that is not local to the second, visited, network system; and program code to transmit the signaling message and the multicast data to the access node.

24. A method of operating an access node for use in a multicast communications system, comprising:

supporting multicast operations including multicast establishment and forwarding operations; and supporting the roaming to, and multicast connectivity at said access node, of a mobile end node, wherein the mobile end node uses a non-local address for the reception of local multicast data from other nodes in a foreign network multicast system, said non-local address corresponding to a home network.

25. An access node for use in a multicast communications system, comprising:

a processor configured to support multicast operations including multicast establishment and forwarding operations, and further configured to support roaming to, and multicast connectivity at said access node, of a mobile end node, wherein the mobile end node uses a non-local address for the reception of local multicast data from other nodes in a foreign network multicast system, said non-local address corresponding to a home network.

26. A non-transitory computer-readable medium containing instructions stored thereon, which, when executed by an access node for use in a multicast communications system, cause the access node to perform operations, the instructions comprising:

program code to support multicast operations including multicast establishment and forwarding operations; and program code to support roaming to, and multicast connectivity at said access node, of a mobile end node, wherein the mobile end node uses a non-local address for the reception of local multicast data from other nodes in a foreign network multicast system, said non-local address corresponding to a home network.

\* \* \* \* \*